(12) United States Patent
Komazawa et al.

(10) Patent No.: US 11,000,865 B2
(45) Date of Patent: *May 11, 2021

(54) FLUID SUPPLY APPARATUS

(71) Applicant: SIO CO., LTD., Hachioji (JP)

(72) Inventors: Masuhiko Komazawa, Hachioji (JP); Masaru Ohki, Hachioji (JP)

(73) Assignee: SIO CO., LTD., Tokyo (JP)

(*) Notice: Subject to any disclaimer, the term of this patent is extended or adjusted under 35 U.S.C. 154(b) by 134 days.

This patent is subject to a terminal disclaimer.

(21) Appl. No.: 16/168,883

(22) Filed: Oct. 24, 2018

(65) Prior Publication Data

US 2019/0118197 A1   Apr. 25, 2019

(30) Foreign Application Priority Data

Oct. 25, 2017 (KR) .............................. 2017-0139355
Jul. 9, 2018 (JP) ................................ 2018-130175

(51) Int. Cl.
| | | |
|---|---|---|
| *B05B 1/00* | (2006.01) | |
| *B05B 1/34* | (2006.01) | |
| *B23Q 11/14* | (2006.01) | |
| *B23Q 11/10* | (2006.01) | |
| *B24B 57/02* | (2006.01) | |

(52) U.S. Cl.
CPC ........ *B05B 1/3447* (2013.01); *B23Q 11/1076* (2013.01); *B23Q 11/1084* (2013.01); *B23Q 11/145* (2013.01); *B24B 57/02* (2013.01)

(58) Field of Classification Search
CPC . B05B 1/3447; B23Q 11/1076; B23Q 11/145; B23Q 11/1084; B24B 57/02

USPC ..................................... 138/42; 366/337–339
See application file for complete search history.

(56) References Cited

U.S. PATENT DOCUMENTS

| | | | |
|---|---|---|---|
| 6,027,241 A | 2/2000 | King | |
| 6,095,899 A | 8/2000 | Elmar et al. | |
| 6,102,561 A * | 8/2000 | King .................... | B01F 5/0614 138/38 |
| 6,508,810 B1 | 1/2003 | Ouchi et al. | |

(Continued)

FOREIGN PATENT DOCUMENTS

| | | |
|---|---|---|
| CN | 102186570 | 9/2011 |
| CN | 103747858 | 4/2014 |

(Continued)

OTHER PUBLICATIONS

Taiwanese Office Action for Taiwanese Patent Application No. 107137552 dated Nov. 6, 2019.

(Continued)

*Primary Examiner* — Qingzhang Zhou
*Assistant Examiner* — Joel Zhou
(74) *Attorney, Agent, or Firm* — Amin, Turocy & Watson, LLP

(57) ABSTRACT

A fluid supply apparatus according to an embodiment of the invention includes a housing and an internal structure which is housed in the hosing. The internal structure includes a shaft portion and a plurality of protrusions protruding from the outer circumferential surface of the shaft portion. A plurality of flow paths are formed between the plurality of protrusions, and a groove having a predetermined depth from the outer circumferential surface of the shaft portion is formed in each of at least a part of the plurality of flow paths.

13 Claims, 19 Drawing Sheets

(56) References Cited

U.S. PATENT DOCUMENTS

| | | | |
|---|---|---|---|
| 7,066,409 B2* | 6/2006 | Negoro | B05B 1/3447 138/42 |
| 9,138,697 B2 | 9/2015 | Hanada | |
| 9,370,784 B2 | 6/2016 | Katou et al. | |
| 2011/0199855 A1* | 8/2011 | Hanada | B01F 5/0657 366/165.1 |
| 2012/0034376 A1 | 2/2012 | Nakamura et al. | |

FOREIGN PATENT DOCUMENTS

| | | |
|---|---|---|
| EP | 1541241 | 6/2005 |
| JP | 3-75877 | 7/1991 |
| JP | 10-192671 | 7/1998 |
| JP | 10-216491 | 8/1998 |
| JP | 11-254281 | 9/1999 |
| JP | 2003-126667 | 5/2003 |
| JP | 2004-33962 | 2/2004 |
| JP | 2006-26583 | 2/2006 |
| JP | 2008-161819 | 7/2008 |
| JP | 3184786 | 7/2013 |
| JP | 2013-223828 | 10/2013 |
| JP | 2017-80721 | 5/2017 |
| KR | 10-2013-0019346 | 3/2003 |
| KR | 101319267 | 10/2013 |
| TW | 201023979 | 7/2010 |
| WO | 01/78884 | 10/2001 |
| WO | 2010/047167 | 4/2010 |
| WO | 2010/113948 | 10/2010 |

OTHER PUBLICATIONS

Korean Office Action for Korean Patent Application No. 2018-0125721 dated Nov. 19, 2019.
Extended European Search Report for European Patent Application No. 18200873.0 dated Mar. 4, 2019.
Chinese Office Action for Chinese Patent Application No. 201811236488.2 dated Jun. 3, 2020.

\* cited by examiner

FLUID SUPPLY APPARATUS

CROSS-REFERENCE TO RELATED APPLICATIONS

This application is based upon and claims the benefit of priority under 35 USC 119 of Korean Patent Application No. 2017-0139355 filed on Oct. 25, 2017 and Japanese Patent Application No. 2018-130175 filed on Jul. 9, 2018, the entire disclosure of which is incorporated herein by reference in its entirety for all purposes.

BACKGROUND OF THE INVENTION

1. Field of the Invention

The present invention relates to a fluid supply apparatus for supplying a fluid. More specifically, the present invention relates to a fluid supply apparatus which provides a predetermined flow characteristic to a fluid flowing therethrough. For example, the fluid supply apparatus of the present invention is applicable to various machine tools such as a grinding machine, a drilling machine, and a cutting machine, as a fluid supply pipe for supplying a cutting fluid.

2. Description of the Related Art

Conventionally, when a workpiece made of metal or the like is machined into a desired shape by a machine tool such as the grinding machine or the drilling machine, a machining fluid (for example, coolant) is supplied to and around a contact portion between the workpiece and a tool (for example, a blade) to cool heat generated during machining or remove debris of the workpiece (also referred to as chips) from a machining spot. Cutting heat caused by high pressure and frictional resistance at the contact portion between the workpiece and the blade abrades the edge of the blade and lowers the strength of the blade, thereby reducing tool life of the blade. In addition, if the chips of the workpiece are not sufficiently removed, they can stick to the edge of the blade during machining, which may degrade machining accuracy.

The machining fluid (also referred to as the cutting fluid) decreases the frictional resistance between the tool and the workpiece, removes the cutting heat, and performs cleaning to remove the chips cut off from a surface of the workpiece. For this, the machining fluid should have a low coefficient of friction, a high boiling point, and good penetration into the contact portion between the blade and the workpiece.

For example, Japanese Patent Application Laid-Open Publication No. 1999-254281 published on Sep. 21, 1999 (published also as U.S. Pat. No. 6,095,899) (hereinafter, referred to as Patent Document 1) discloses providing a gas emitting means for emitting a gas (for example, air) in a machining apparatus in order to forcibly infiltrate a machining liquid into a contact portion between a working element (i.e. a blade) and a workpiece.

Further, Japanese Patent Application Laid-Open Publication No. 2004-33962 published on Feb. 5, 2004 (published also as U.S. Pat. No. 7,066,409) (hereinafter, referred to as Patent Document 2) discloses a fluid discharge pipe structure in which a spiral blade body and a flip-flop phenomenon generating shaft body are aligned with each other and inserted and fixed in a pipe main body.

According to the conventional technology as disclosed in the Patent Document 1, the means for emitting the gas at a high speed and high pressure should be provided in the machining apparatus in addition to a means for spraying the machining liquid, thus increasing the cost and the size of the apparatus. Further, in the grinding machine, the machining liquid cannot sufficiently reach a contact portion between a grindstone and the workpiece because the air rotates along the outer circumferential surface of the grindstone together with the grindstone rotating at a high speed. Thus, there is still a problem that it is difficult to cool the heat generated during machining to a desired level because the machining liquid cannot sufficiently penetrate into the contact portion by simply emitting the air in the same direction as the rotation direction of the grindstone.

In the fluid discharge pipe structure disclosed in Patent Document 2, the spiral blade body and the flip-flop phenomenon generating shaft body are separate parts. Thus, in the case that both of the two parts are made of metal, the ends of the two parts are sharp and alignment of the parts should be performed with caution required when the positioning operation is performed, which lowers the working efficiency. Further, high precision of machining is required in order to match the dimensions of the two separate parts.

SUMMARY OF THE INVENTION

The present invention was made in light of the problems mentioned above. An object of the present invention is to provide a fluid supply apparatus for providing a predetermined flow characteristic to a fluid flowing therethrough to improve lubricity, penetrability, and a cooling effect of the fluid, which is easy to manufacture.

In order to achieve the above object, an aspect of the present invention is to provide a fluid supply apparatus including a housing and an internal structure which is housed in the hosing. The internal structure includes a shaft portion and a plurality of protrusions protruding from the outer circumferential surface of the shaft portion. A plurality of flow paths are formed between the plurality of protrusions and a groove having a predetermined depth from the outer circumferential surface of the shaft portion is formed in each of at least a part of the plurality of flow paths. It is not required that the groove is formed in every flow path. In many embodiments, the groove is formed in a spiral flow path formed by the plurality of protrusions on the outer circumferential surface of the shaft portion. In another embodiment, the groove is formed in a closed flow path which is circular or elliptical formed on the outer circumferential surface of the shaft portion.

One embodiment of the fluid supply apparatus is a fluid supply pipe. In this embodiment, the fluid supply pipe includes the internal structure and a pipe body as the housing in which the internal structure is housed, and the pipe body has an inlet and an outlet.

Another aspect of the present invention is to provide an internal structure of a fluid supply apparatus including a first portion and a second portion, which are formed integrally on a common shaft member having a circular cross-section. The first portion of the internal structure is positioned upstream of a housing when the internal structure is housed in the housing and comprises a shaft portion and at least one spiral vane to swirl a fluid. The second portion of the internal structure is positioned downstream from the first portion and comprises a shaft portion and a plurality of protrusions protruding from the outer circumferential surface of the shaft portion. A plurality of flow paths are formed between the plurality of protrusions of the second portion, and a groove having a predetermined depth from the outer circumferential surface of the shaft portion of the second portion is formed in each of at least a part of the plurality of flow paths. According to an embodiment, the radius of the shaft portion of the second portion is larger than the radius of the shaft portion of the first portion. In this case, the groove is formed on the shaft portion of the second portion of the internal structure and, for example, the depth of the groove is the same as the difference between the radius of the shaft portion of the second portion and the radius of the shaft portion of the first portion.

A further another aspect of the present invention is to provide a fluid supply apparatus including an internal structure and a housing configured to house the internal structure and having an inlet and an outlet. The internal structure includes a first portion, a second portion, a third portion, and a fourth portion, which are formed integrally on a common shaft member having a circular cross-section. The first portion of the internal structure is positioned upstream of the housing when the internal structure is housed in the housing and comprises a shaft portion and at least one spiral vane to swirl a fluid. The second portion of the internal structure is positioned downstream from the first portion and comprises a shaft portion and a plurality of protrusions protruding from the outer circumferential surface of the shaft portion. The third portion of the internal structure is positioned downstream from the second portion and comprises a shaft portion and at least one spiral vane to swirl a fluid. The fourth portion of the internal structure is positioned downstream from the third portion and comprises a shaft portion and a plurality of protrusions protruding from the outer circumferential surface of the shaft portion. A plurality of flow paths are formed between the plurality of protrusions of the fourth portion, and a groove having a predetermined depth from the outer circumferential surface of the shaft portion of the fourth portion is formed in each of at least a part of the plurality of flow paths. In an embodiment, a plurality of flow paths are formed between the plurality of protrusions of the second portion, and a groove having a predetermined depth from the outer circumferential surface of the shaft portion of the second portion is formed in each of at least a part of the plurality of flow paths.

A further another aspect of the present invention is to provide a fluid supply apparatus including a first internal structure, a second internal structure, and a housing configured to house the first internal structure and the second internal structure and having an inlet and an outlet. The first internal structure includes a head portion and a body portion, which are formed integrally on a common shaft member having a circular cross-section, the head portion of the first internal structure is positioned upstream of the housing when the first internal structure is housed in the housing and comprises a shaft portion and at least one spiral vane to swirl a fluid, and the body portion of the first internal structure is positioned downstream from the head portion and comprises a shaft portion and a plurality of protrusions protruding from the outer circumferential surface of the shaft portion. The second internal structure formed in a hollow shaft shape includes a head portion and a body portion, which are formed integrally on a common hollow shaft member, the head portion of the second internal structure is positioned upstream of the housing when the second internal structure is housed in the housing and comprises a shaft portion and at least one spiral vane to swirl a fluid, and the body portion is positioned downstream from the head portion and comprising a plurality of protrusions on its outer circumferential surface. At least a part of the first internal structure is housed in the hollow of the second internal structure. A plurality of flow paths are formed between the plurality of protrusions of the body portion of the second internal structure, and a groove having a predetermined depth from the outer circumferential surface of the shaft portion of the body portion of the second internal structure is formed in each of at least a part of the plurality of flow paths. In an embodiment, a plurality of flow paths are formed between the plurality of protrusions of the body portion of the first internal structure, and a groove having a predetermined depth from the outer circumferential surface of the shaft portion of the body portion of the first internal structure is formed in each of at least a part of the plurality of flow paths.

If the fluid supply apparatus according to some embodiments of the present invention is provided in a fluid supply unit of a machine tool or the like, a cleaning effect is improved over the prior art due to vibration and impact generated during a process in which a plurality of fine bubbles (such as micro bubbles or smaller ultra-fine bubbles (so-called nano bubbles of the order of nanometer)) generated inside the fluid supply apparatus collide with the tool and the workpiece and break. Thus, the life of the tool such as the blade can be extended and the cost of replacing the tool can be reduced. In addition, a flow characteristic provided by the fluid supply apparatus according to some embodiments of the present invention can decrease the surface tension of the fluid and increase the penetrability and lubricity of the fluid due to generation of the fine bubbles. As a result, it is possible to improve the effect of cooling heat generated at the contact portion between the tool and the workpiece. According to many embodiments of the present invention, it is possible to increase the cooling effect and improve the lubricity by increasing the penetrability of the fluid, thereby enhancing the precision of machining.

Further, according to some embodiments of the present invention, a groove is formed in each of a plurality of flow paths in a shaft portion of at least a part of the internal structure of the fluid supply apparatus. According to some embodiments of the present invention, grooves of a predetermined depth from the outer circumferential surface of a shaft portion of the internal structure of the fluid supply apparatus are formed in all or a part of a plurality of flow paths formed between a plurality of protrusions of the internal structure. In the flow path in which the groove is formed, the velocity of the fluid does not decrease even at the bottom of the flow path. Thus, flow of the fluid is optimized. Therefore, the fluid can flow smoothly from the upstream side to the downstream side of the fluid supply apparatus. In the case that there exists a step due to a difference in diameter between the shaft parts of the internal structure, the groove guides the fluid smoothly to the downstream side in spite of of the step. Further, the flow of the fluid is optimized over the entire flow path in which a guide channel and the groove subsequent and connected to the guide channel are formed. In addition, according to many embodiments of the present invention, an internal structure of a fluid supply pipe is fabricated as a single component in which a plurality of portions for changing flow characteristics of the fluid are integrated on one shaft member. Therefore, assembly of the internal structure and a housing (for example, a pipe body) is simplified.

The fluid supply apparatus of the present invention can be applied to a machining fluid supply unit in various machine tools such as the grinding machine, the cutting machine, and the drilling machine. It can also be effectively used in an apparatus for mixing two or more fluids (liquid and liquid, liquid and gas, or gas and gas). In addition, the present invention is applicable to various situations requiring supply of a fluid, such as a household shower nozzle or a hydroponics system. For example, a shower nozzle includes a fluid supply apparatus according to an embodiment of the present invention. Here, water of a predetermined temperature flows into the fluid supply apparatus, a predetermined flow characteristic is provided to the water, and the shower nozzle discharges the water from the fluid supply apparatus to improve a cleaning effect. In particular, due to the fine bubbles, the surface tension of the fluid decreases and the penetrability increases. As another example, a hydroponics system allows water to flow into the fluid supply apparatus, dissolved oxygen in the water increases through the fluid supply apparatus, and the water is discharged from the fluid supply apparatus.

BRIEF DESCRIPTION OF THE DRAWINGS

The above and further objects and novel features of the present invention will more fully appear from the following detailed description when the same is read in conjunction with the accompanying drawings. It is to be expressly understood, however, that the drawings are for the purpose of illustration only and are not intended to limit the scope of the invention.

Here.

DETAILED DESCRIPTION OF THE PREFERRED EMBODIMENT

Embodiments in which the present invention is applied to machine tools such as a grinding machine will be mainly described herein. However, the field of application of the present invention is not intended to be limited to the illustrated examples. The present invention is applicable to various situations requiring supply of a fluid, such as a household shower nozzle, a fluid mixing apparatus, or a hydroponics system.

Hereinafter, the embodiments of the present invention will be described with reference to the accompanying drawings.

Figure 1:
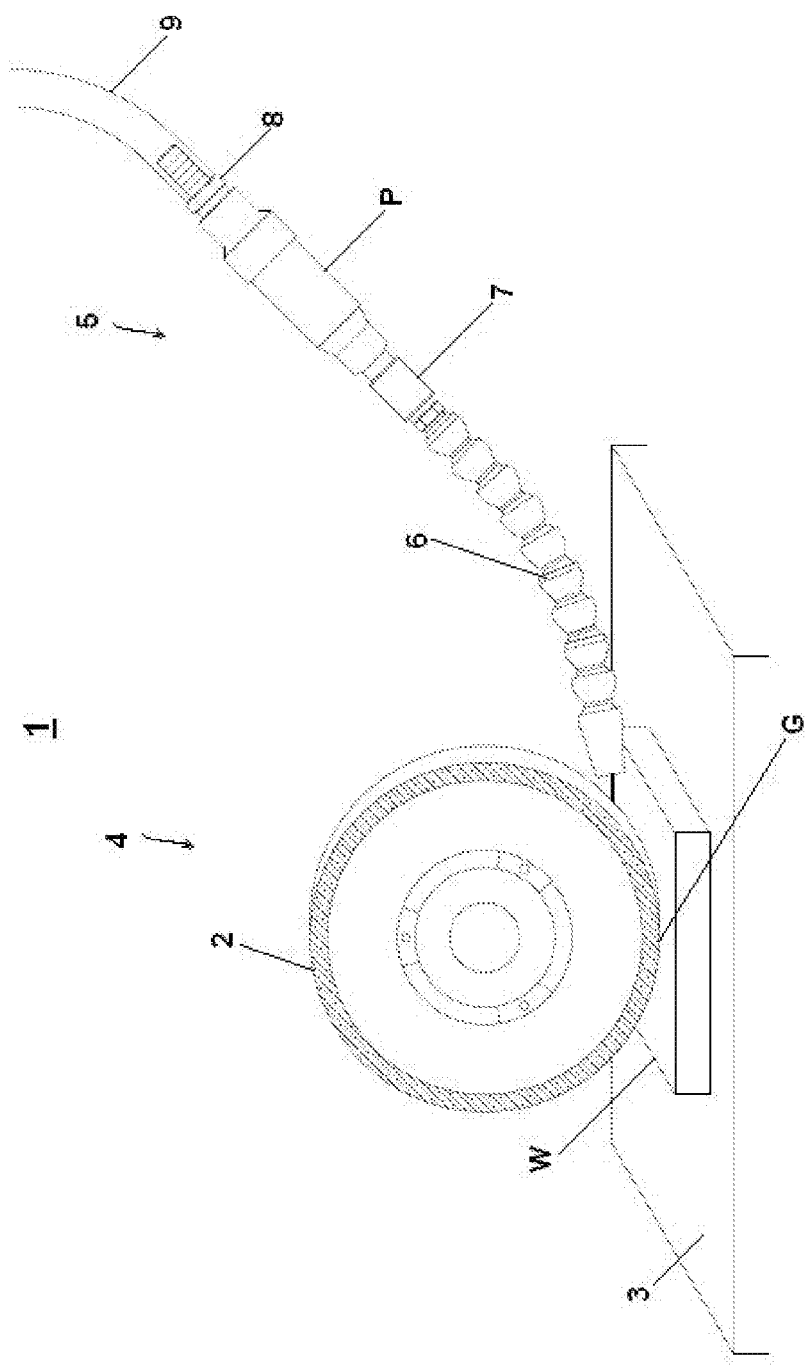
FIG. 1 shows a grinding machine including a fluid supply unit to which the present invention is applied.

FIG. 1 shows an embodiment of a grinding machine including a fluid supply unit to which the present invention is applied. As shown, a grinding machine 1 includes a grinding unit 4 including a grinding blade (a grindstone) 2, a table 3 for moving a workpiece W in two dimensions, and a column for vertically moving the workpiece W or the grinding blade 2 (not shown in the drawing), and a fluid supply unit 5 for supplying a fluid (i.e. coolant) to the grinding blade 2 or the workpiece W. For example, the fluid is water. The grinding blade 2 is rotationally driven in the clockwise direction in the plane of FIG. 1 by a driving source (not shown in the drawing). A surface of the workpiece W is ground by friction between the outer circumferential surface of the grinding blade 2 and the workpiece W at a grinding spot G. Although not shown in the drawing, the fluid supply unit 5 includes a tank in which the fluid is stored and a pump for discharging the fluid from the tank.

The fluid supply unit 5 includes a nozzle 6 having an outlet through which the fluid is discharged toward the grinding blade 2 and the workpiece W, a fluid supply pipe P including an internal structure for providing a predetermined flow characteristic to the fluid, and a delivery pipe 9 into which the fluid stored in the tank flows by the pump. The fluid supply pipe P is an example of a fluid supply apparatus of the present invention. A joint 7 connects the nozzle 6 and an outlet side of the fluid supply pipe P. A joint 8 connects the delivery pipe 9 and an inlet side of the fluid supply pipe P. The fluid flowing into the fluid supply pipe P from the delivery pipe 9 has a predetermined flow characteristic provided by the internal structure while passing though the fluid supply pipe P. The fluid is discharged toward the grinding spot G from an outlet of the fluid supply pipe P through the nozzle 6. According to many embodiments of the present invention, the fluid passing through the fluid supply pipe P includes fine bubbles. Hereinafter, various embodiments of the fluid supply pipe P will be described with reference to the drawings. Note that the fluid supply pipe P is not limited to a pipe as shown in the various embodiments hereinafter. The pipe body may be changed to various types of housing or container having a specific outside appearance. However, the inner surface of the housing (which contacts the fluid flowing between the inner surface and the internal structure) preferably forms a cylinder.

First Embodiment

Figure 2:
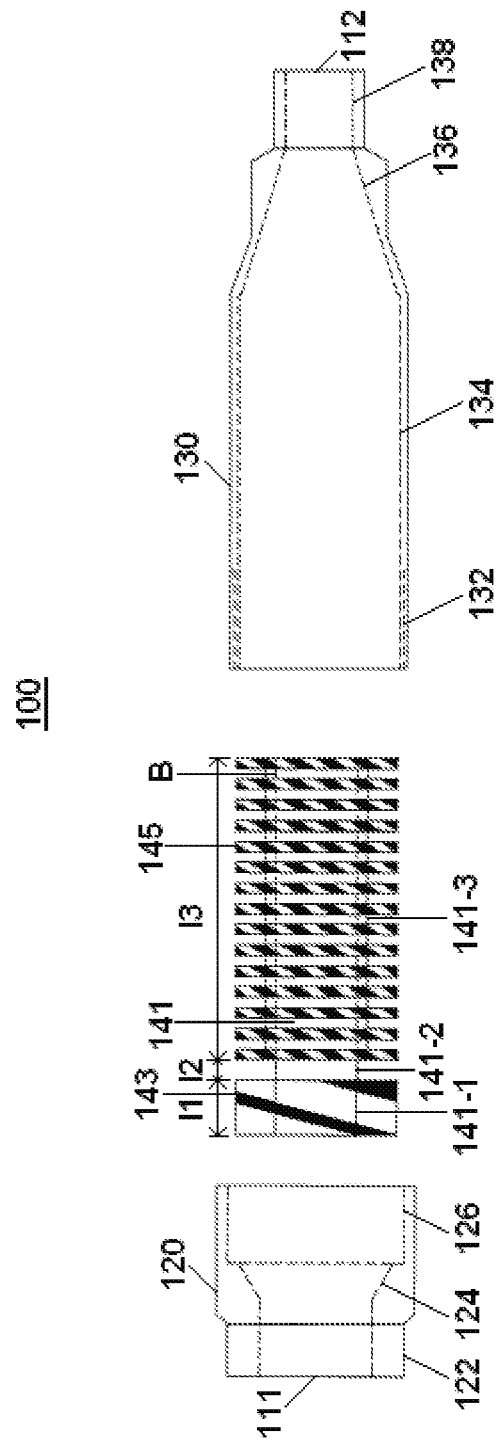
FIG. 2 is a side exploded view of a fluid supply pipe according to a first embodiment of the present invention.
Figure 3:
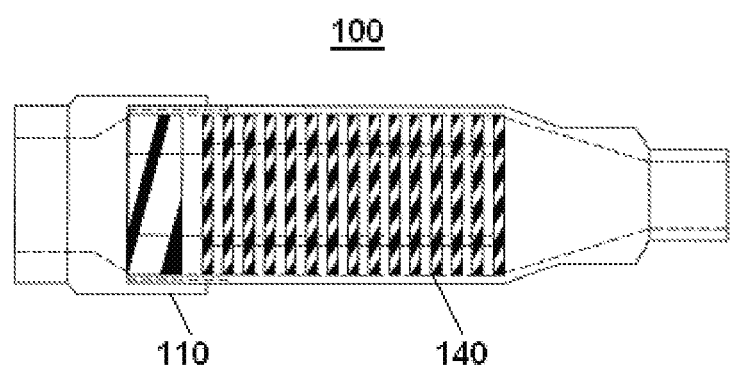
FIG. 3 is a side sectional view of the fluid supply pipe according to the first embodiment of the present invention.
Figure 4:
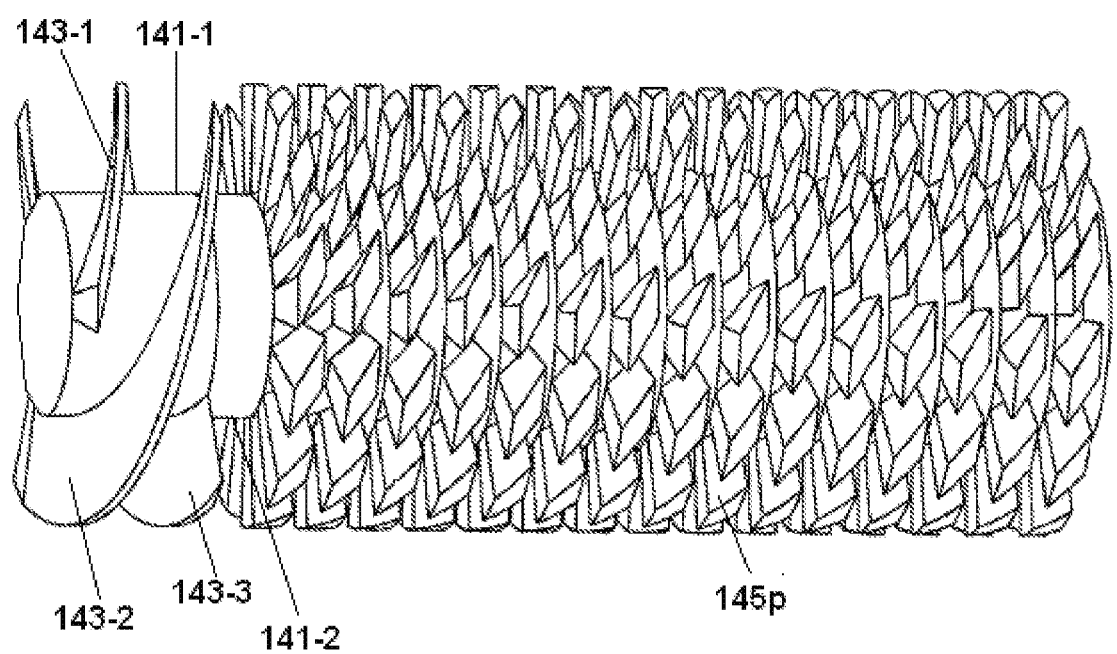
FIG. 4 is a three-dimensional view of an internal structure of the fluid supply pipe according to the first embodiment of the present invention.

FIG. 2 is a side exploded view of a fluid supply pipe 100 according to a first embodiment of the present invention, and FIG. 3 is a side sectional view of the fluid supply pipe 100. FIG. 4 is a three-dimensional view of an internal structure 140 of the fluid supply pipe 100. As shown in FIGS. 2 and 3, the fluid supply pipe 100 includes a pipe body 110 and the internal structure 140. In FIGS. 2 and 3, the fluid flows from an inlet 111 to an outlet 112.

The pipe body 110 functions as a housing or a container to house the internal structure 140 in its internal cylindrical space. The pipe body 110 includes an inlet side member 120 and an outlet side member 130. In the present embodiment, each of the inlet side member 120 and the outlet side member 130 is formed in a hollow tube shape. The inlet side member 120 has the inlet 111 having a predetermined diameter at one end and a female screw 126 for connection with the outlet side member 130 which is formed by thread-cutting an inner circumferential surface of the inlet side member 120 at the other end. A connecting portion 122 is formed on the side of the inlet 111 and is coupled with the joint 8 (see FIG. 1). For example, the inlet side member 120 and the joint 8 are coupled by engaging a female screw formed on an inner circumferential surface of the connecting portion 122 with a male screw formed on an outer circumferential surface of one end of the joint 8. In the present embodiment, the inner diameters of the both ends of the inlet side member 120, i.e. the inner diameter of the inlet 111 and the inner diameter of the female screw 126 are different from each other, and the inner diameter of the inlet 111 is smaller than the inner diameter of the female screw 126, as shown in FIG. 2. A tapered portion 124 is formed between the inlet 111 and the female screw 126. However, the present invention is not limited to this embodiment. In another embodiment, the inner diameters of the both ends of the inlet side member 120 are the same.

The outlet side member 130 has the outlet 112 having a predetermined diameter at one end and a male screw 132 for connection with the inlet side member 120 which is formed by thread-cutting an outer circumferential surface of the outer side member 130 at the other end. The diameter of the outer circumferential surface of the male screw 132 of the outlet side member 130 is the same as the inner diameter of the female screw 126 of the inlet side member 120. A connecting portion 138 is formed on the side of the outlet 112 and is coupled with the joint 7 (see FIG. 1). For example, the outlet side member 130 and the joint 7 are coupled by engaging a female screw formed on an inner circumferential surface of the connecting portion 138 with a male screw formed on an outer circumferential surface of one end of the joint 7. A tubular portion 134 and a tapered portion 136 are formed between the male screw 132 and the connecting portion 138. In the present embodiment, the inner diameters of the both ends of the outlet side member 130, i.e. the inner diameter of the outlet 112 and the inner diameter of the male screw 132 are different from each other, and the inner diameter of the outlet 112 is smaller than the inner diameter of the male screw 132. However, the present invention is not limited to this embodiment. In another embodiment, the inner diameters of the both ends of the outlet side member 130 are the same. The pipe body 110 is formed by connecting the inlet side member 120 and the outlet side member 130 by screw-joining the female screw 126 of the inner circumferential surface of one end of the inlet side member 120 and the male screw 132 of the outer circumferential surface of one end of the outlet side member 130.

The above described configuration of the pipe body 110 is merely an embodiment, and the present invention is not limited to the configuration. For example, connection of the inlet side member 120 and the outlet side member 130 is not limited to the screw-joining and any method for connecting mechanical components known in the art is applicable. Further, the shapes of the inlet side member 120 and the outlet side member 130 are not limited to those shown in FIGS. 2 and 3, respectively. A designer of the fluid supply pipe 100 may arbitrarily design the inlet side member 120 and the outlet side member 130 or change their shapes according to applications of the fluid supply pipe 100. Each of the inlet side member 120 and the outlet side member 130 can be made of metal such as steel, plastic, or the like. Referring to FIGS. 2 and 3, the fluid supply pipe 100 is assembled by housing the internal structure 140 in the outlet side member 130, and then engaging the male screw 132 of the outer circumferential surface of the outlet side member 130 with the female screw 126 of the inner circumferential surface of the inlet side member 120.

The internal structure 140 can be formed by processing a cylindrical member made of metal such as steel or by molding plastic, for example. As shown in FIGS. 2 and 4, the internal structure 140 includes a swirl generating portion 143 and a flow characteristic providing portion 145, from the upstream side to the downstream side, which are formed integrally on a common shaft member 141 having a circular cross-section. For example, each of the swirl generating portion 143 and the flow characteristic providing portion 145 is formed by machining a part of the cylindrical member.

The swirl generating portion 143 corresponds to a part or the whole of a head portion of the internal structure 140 which is placed in the upstream side of the pipe body 110 when the internal structure 140 is housed in the pipe body 110. As shown in FIG. 4, the swirl generating portion 143 includes a shaft portion 141-1 having a circular cross-section and three spiral vanes 143-1, 143-2, and 143-3. The shaft portion 141-1 has a diameter constant along the longitudinal direction of the shaft member 141. As shown in FIG. 2, the length of the shaft portion 141-1 of the swirl generating portion 143 (l1) is longer than the length of a shaft portion 141-2 (l2) and is shorter than the length of a shaft portion 141-3 of the flow characteristic providing portion 145 (l3), in the present embodiment. Each of the vanes 143-1, 143-2, and 143-3 of the swirl generating portion 143 has its end spaced by 120 degrees from each other in the circumferential direction of the shaft portion 141-1. The vanes 143-1, 143-2, and 143-3 are formed in a spiral shape in the counterclockwise direction at a predetermined interval on the outer circumferential surface from one end to the other end of the shaft portion 141-1. The number of the vanes is three in the present invention, but the present invention is not limited this embodiment. Further, the shape of the vanes 143-1, 143-2, and 143-3 of the swirl generating portion 143 is not particularly limited if the vanes can cause swirling flow of the fluid while the fluid passes between the vanes. In the present embodiment, the outer diameter of the swirl generating portion 143 is such that it is close to the inner circumferential surface of the tubular portion 134 of the outlet side member 130 of the pipe body 110 when the internal structure 140 is housed in the pipe body 110. In another embodiment, the internal structure 140 does not have the swirl generating portion 143. In this case, the shaft member 141 may have only the flow characteristic providing portion 145 or may include a portion performing a different function upstream or downstream from the flow characteristic providing portion 145. These various modifications are applicable to other embodiments which will be described later.

The flow characteristic providing portion 145 is formed downstream from the swirl generating portion 143 and corresponds to a part or the whole of a body portion of the internal structure 140. As shown in FIGS. 2 and 4, the flow characteristic providing portion 145 includes the shaft portion 141-3 having a circular cross-section and a plurality of protrusions 145p protruding from the outer circumferential surface of the shaft portion 141-3. The shaft portion 141-3 has a diameter constant along the longitudinal direction of the shaft member 141. In the present embodiment, the diameter of the shaft portion 141-3 of the flow characteristic providing portion 145 is larger than the diameter of the shaft portion 141-1 of the swirl generating portion 143 and the diameter of the shaft portion 141-2. Thus, an enough flow rate of the fluid flows into the swirl generating portion 143 and the turning force of the fluid induced by the swirl generating portion 143 becomes sufficiently strong. The cross-sectional area of a path through which the fluid flows is sharply reduced while the fluid flows from the swirl generating portion 143 to the flow characteristic providing portion 145, which changes flow characteristics of the fluid. In addition, a step exists between the swirl generating portion 143 and the flow characteristic providing portion 145 due to the difference in diameter between their shaft portions, and one or more grooves for guiding the fluid are formed between the protrusions 145p of the flow characteristic providing portion 145.

Figure 5A:
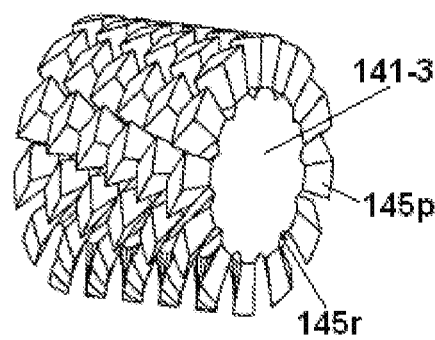
FIG. 5A is a three-dimensional view of a flow characteristic providing portion of the internal structure of the fluid supply pipe when supposing that the internal structure is virtually cut.
Figure 5B:
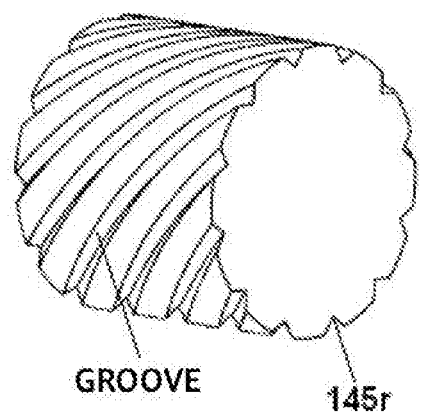
FIG. 5B shows a hypothetical state in which all protrusions are removed from the flow characteristic providing portion shown in FIG. 5A.
Figure 6A:
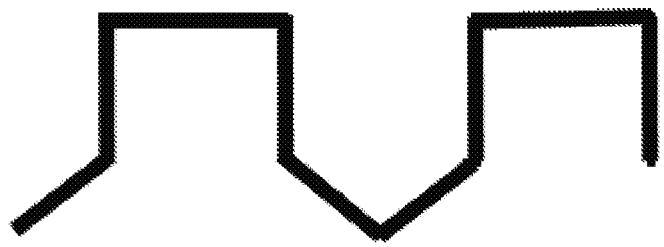
FIG. 6A is a schematic diagram showing a V-shaped groove formed between the protrusions of the flow characteristic providing portion.
Figure 6B:
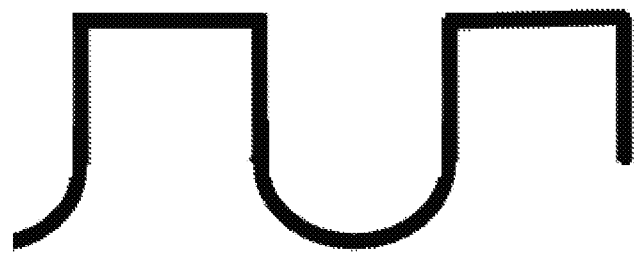
FIG. 6B is a schematic diagram showing an R-shaped groove formed between the protrusions of the flow characteristic providing portion.
Figure 6C:
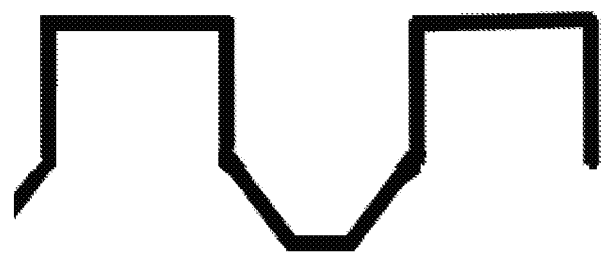
FIG. 6C is a schematic diagram showing a trapezoidal groove formed between the protrusions of the flow characteristic providing portion.

FIG. 5A is a three-dimensional view of the flow characteristic providing portion 145 of the internal structure 140 according to the present embodiment when supposing that the internal structure 140 is virtually cut at the boundary between the shaft portion 141-2 and the shaft portion 141-3 in the direction orthogonal to the central axis of the shaft member 141. FIG. 5B shows a hypothetical state in which all of the protrusions 145p are removed from the flow characteristic providing portion 145 shown in FIG. 5A. As shown in FIG. 5A, the plurality of protrusions 145p of the flow characteristic providing portion 145 are formed in a net shape and each protrusion is in the form of a pillar having a rhombic (i.e. diamond-shaped) cross-section. Each of the plurality of rhombic protrusions 145p is formed, for example, by grinding the cylindrical member so as to protrude outward radially from the outer circumferential surface of the shaft portion 141-3. As shown in FIG. 5B, a plurality of grooves (in the present example, twelve grooves) of a predetermined depth are formed on the outer circumferential surface of the shaft portion 141-3 of the flow characteristic providing portion 145 between the protrusions 145p so as to spirally extend from one end to the other end of the shaft portion 141-3 along the circumference of the shaft portion 141-3. Each of the grooves functions as a guide channel for guiding the fluid at the upstream side of the flow characteristic providing portion 145. FIGS. 5A and 5B show the embodiment in which the groove has a V-shaped cross-section, but the present invention is not limited to this embodiment. FIGS. 6A to 6C show various exemplary shapes of a cross-section of the groove. FIG. 6A is a schematic diagram showing a cross-section in the shape of "V" (hereinafter, the groove having such a cross-section is referred to as a V-shaped groove), FIG. 6B is a schematic diagram showing a cross-section in the shape of "R" (hereinafter, the groove having such a cross-section is referred to as a R-shaped groove), and FIG. 6C is a schematic diagram showing a cross-section in the shape of a trapezoid (hereinafter, the groove having such a cross-section is referred to as a trapezoidal groove). The cross-section of the groove may have another polygonal shape (hereinafter, the groove having such a cross-section is referred to as a polygonal groove). Further, the number of grooves is not limited to twelve. These various modifications are applicable to other embodiments which will be described later.

Figure 7:
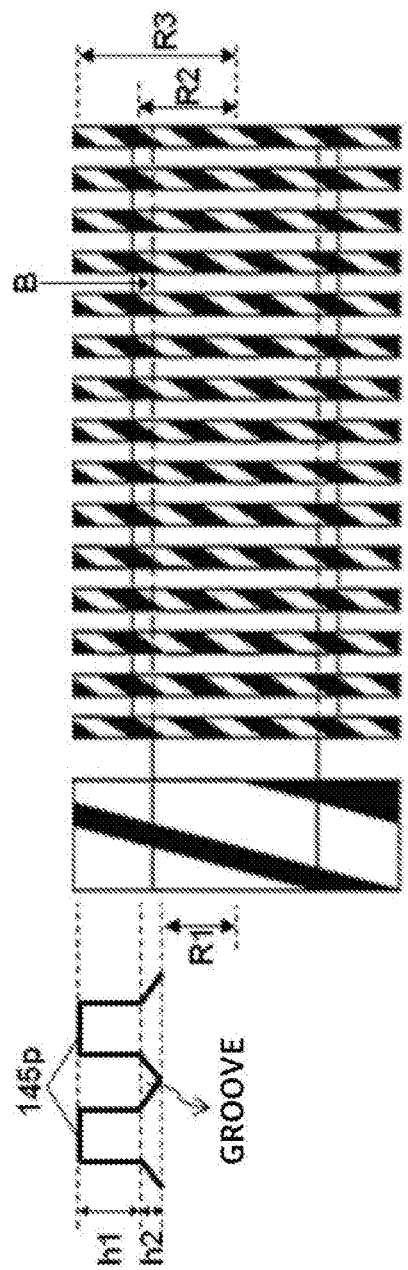
FIG. 7 is a schematic diagram showing the structure of the flow characteristic providing portion of the internal structure of the fluid supply pipe according to the first embodiment of the present invention.

FIG. 7 is a diagram showing the structures of the protrusions 145p and the groove including a guide channel 145r formed in a flow path connected to the guide channel 145r of the flow characteristic providing portion 145 according to the present embodiment. In the embodiment shown in FIG. 7, the groove has the V-shaped cross-section. The radius R1 of the shaft portion 141-1 of the swirl generating portion 143 and the shaft portion 141-2 is smaller than the radius R2 of the shaft portion 141-3 of the flow characteristic providing portion 145. The depth of the groove (in other words, the groove's height) h2 is as (R2−R1). Thus, the difference in diameter between the shaft portions of the swirl generating portion 143 and the flow characteristic providing portion 145 is offset and the fluid passing the swirl generating portion 143 can be guided smoothly to the flow characteristic providing portion 145 in spite of the step due to the difference in diameter. The height of the protrusion 145p is h1 and the radius R3 of the flow characteristic providing portion 145 is determined as (R2+h1). A dashed line B shown in FIGS. 2 and 7 (and FIGS. 10, 12 and 14 related to other embodiments) indicates the position of the bottom surface of the groove (for example, a vertex of the "V"). The present invention is not limited to this embodiment. The depth of the groove is sufficient to completely or partially offset the difference between R1 and R2 so that the fluid can be smoothly guided from the swirl generating portion 143 to the flow characteristic providing portion 145. In another embodiment, the guide channel is formed such that the depth of the groove is (R2−R1) at the boundary between the shaft portions 141-2 and 141-3 (i.e. at the upstream end of the flow characteristic providing portion 145) and the groove becomes gradually shallower so that the depth is zero at a predetermined point. In other words, the guide channel is formed in a tapered shape from the upstream end to a predetermined point of the flow characteristic providing portion 145. This modification is applicable to other embodiments which will be described later.

Figure 8:
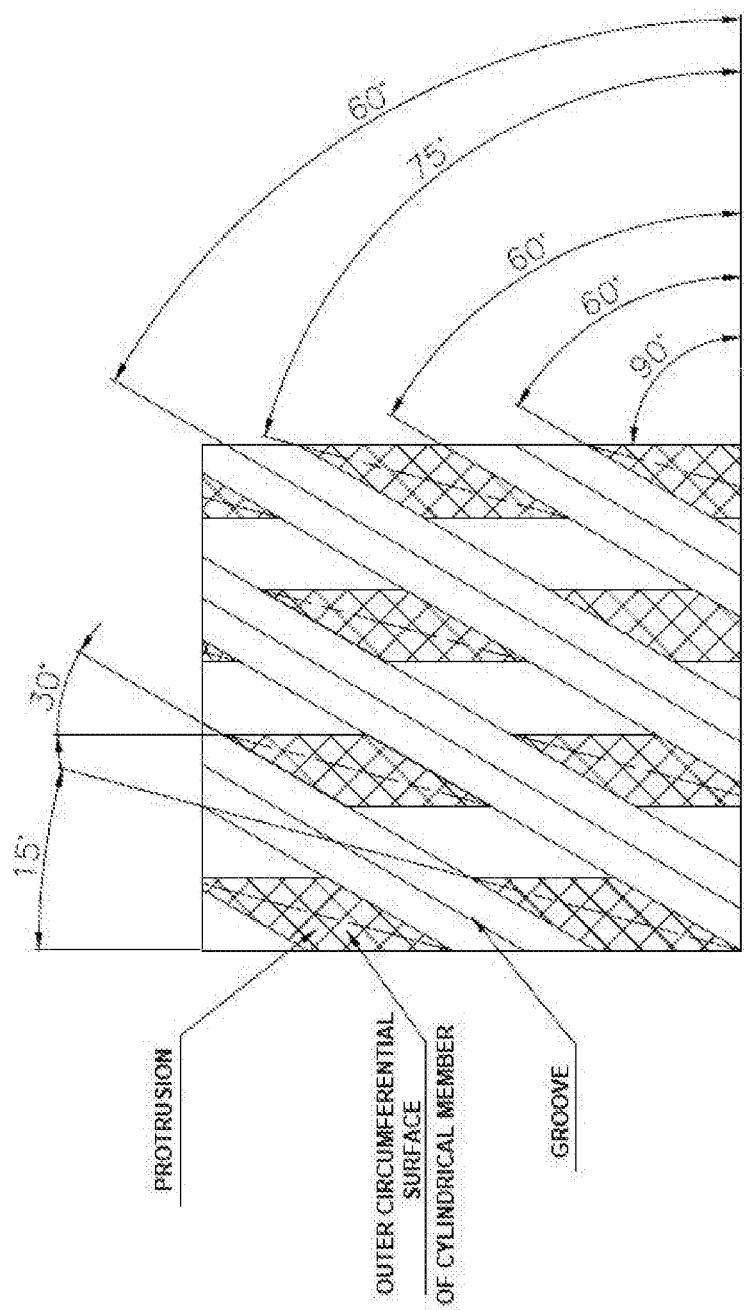
FIG. 8 is a drawing for explaining an exemplary method for forming the flow characteristic providing portion of the internal structure of the fluid supply pipe according to the first embodiment of the present invention.

FIG. 8 is a drawing for explaining an exemplary method for forming the rhombic protrusions 145p and the grooves including the guide channel 145r according to the present embodiment. A plurality of lines with predetermined spacing therebetween in the direction of 90 degrees with respect to the longitudinal direction of the cylindrical member and a plurality of lines having a predetermined angle (for example, 60 degrees) with respect to the longitudinal direction with predetermined spacing therebetween are intersected with each other. In other words, the plurality of protrusions are formed by intersecting a plurality of spiral flow paths spaced along the circumference of the shaft portion and a plurality of closed flow paths spaced along the longitudinal direction of the shaft portion. Spaces between the lines in the direction of 90 degrees are ground alternately to a depth of h1, and spaces between the tilted lines are ground alternately to a depth of (h1+h2) in the shape of "V" (see FIG. 7). By this, the plurality of rhombic protrusions 145p protruding from the outer circumferential surface of the shaft portion 141-3 are formed regularly and alternately in the vertical direction (the circumferential direction of the shaft portion 141-3) and the horizontal direction (the longitudinal direction of the shaft portion 141-3). Further, a plurality of guide channels and grooves subsequent thereto having the depth of h2 in the radial direction of the shaft portion 141-3 from the outer circumferential surface of the shaft portion 141-3 which is the bottom of the plurality of closed flow paths are formed on the outer circumferential surface of the shaft portion 141-3 along the tilted lines. In the present embodiment, the outer diameter of the first flow characteristic providing portion 145 is such that it is close to the inner circumferential surface of the tubular portion 134 of the outlet side member 130 of the pipe body 110 when the internal structure 140 is housed in the pipe body 110. The cross-section of each of the plurality of protrusions 145p may not be rhombic (for example, the shape of the cross-section may be a triangle or another polygon), and the arrangement of the protrusions 145p may be modified by changing the angle of the lines, the width between the protrusions, and the like. These modifications can also be applied to other embodiments which will be described later. While the rhombic protrusions 145p and the guide channels 145r and grooves subsequent thereto are formed by grinding in the present embodiment, they may be formed by another method. For example, cutting, turning, end milling, or any combination of them can be used instead of grinding to reduce machining time. Such various machining methods are also applicable to other types of protrusions, other types of guide channels and grooves subsequent thereto, and other embodiments which will be described later.

Figure 9:
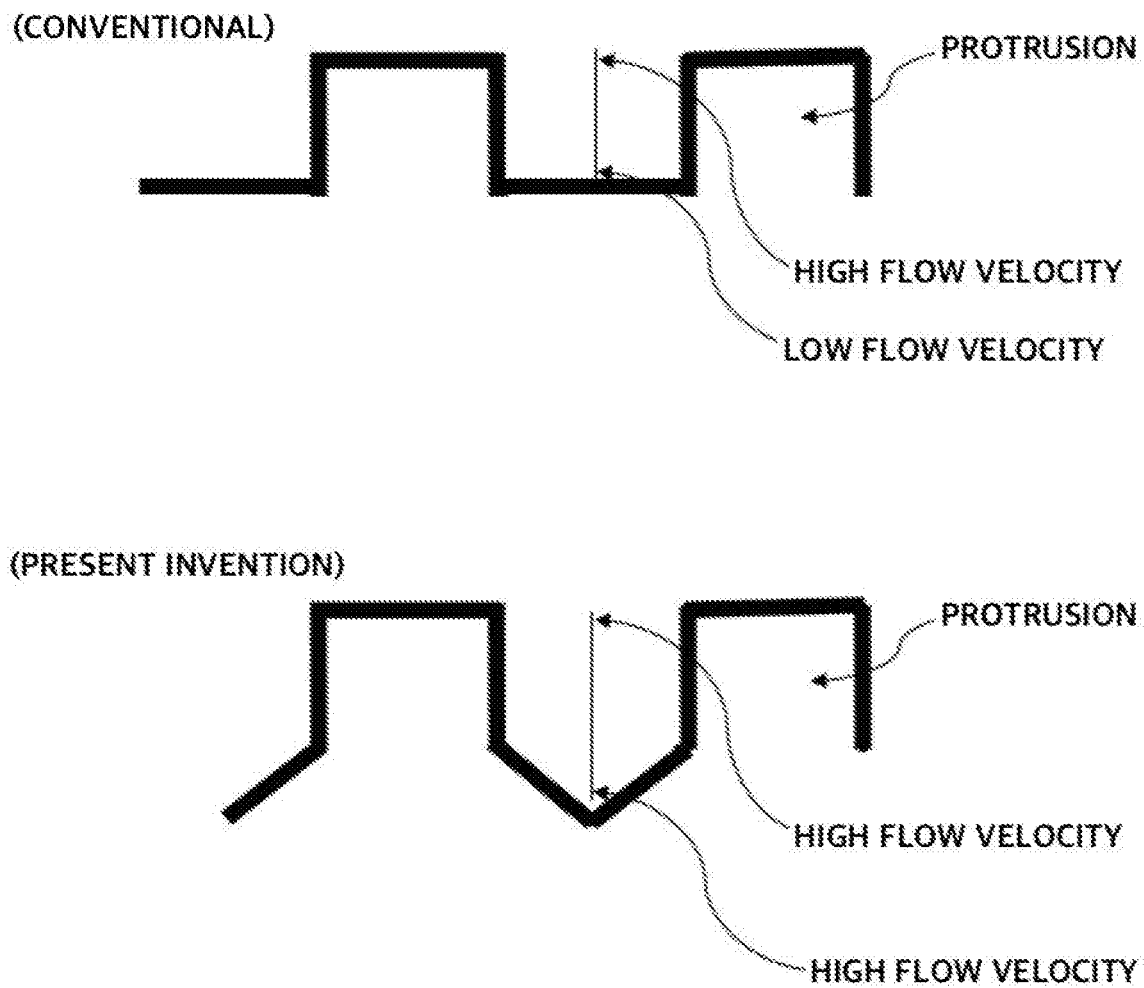
FIG. 9 is a schematic drawing for explaining an effect of the groove formed in the flow characteristic providing portion of the internal structure of the fluid supply pipe according to the first embodiment of the present invention.

FIG. 9 is a schematic drawing for explaining an effect of the grooves formed in the flow characteristic providing portion 145 according to the present embodiment. According to a conventional pipe as disclosed in Japanese Patent Application Laid-open Publication No. 2004-33962, a flow path between protrusions has a shape shown in the upper part of FIG. 9. The flow of the fluid is disturbed by friction between the fluid and the bottom surface of the flow path, and the flow velocity decreases toward the bottom of the flow path. In the case that there is a step due to the difference in diameter between the shaft portions of the swirl generating portion and the flow characteristic providing portion, the slowdown in the flow velocity at the bottom of the flow path is worse. The slowdown in the flow velocity is undesirable because it reduces the change in the characteristics of the flow of the fluid in the flow characteristic providing portion 145 as described below. On the other hand, according to many embodiments of the present invention, the guide channels between the protrusions and the subsequent grooves provided in the flow paths between the protrusions are formed as shown in the lower part of FIG. 9. As described above, the guide channel and the subsequent groove are the V-shaped, R-shaped, trapezoidal, or other polygonal groove formed on the outer circumferential surface of the shaft portion of the flow characteristic providing portion. By this structure, the flow velocity does not decrease even at the bottom of the flow path and the flow of the fluid is improved. Since the twelve guide channels formed between the protrusions eliminate the step due to the difference in diameter between the shaft portions of the swirl generating portion 143 and the flow characteristic providing portion 145 and the subsequent grooves continuing from the upstream side to the down stream side prevent the flow velocity from being slowed down, the fluid can be smoothly guided from the swirl generating portion 143 and the shaft portion 141-2 to the flow characteristic providing portion 145 and a good flow rate can be maintained over the entire flow characteristic providing portion 145.

In the present embodiment, the diameter of the shaft portion 141-1 of the swirl generating portion 143 is the same as the diameter of the shaft portion 141-2, as shown in FIG. 2. Further, the length of the shaft portion 141-3 of the flow characteristic providing portion 145 (13) is longer than the the length of the shaft portion 141-1 of the swirl generating portion 143 (11) and is longer than the length of the shaft portion 141-2 (12). However, the present invention is not limited to thereto. In another embodiment, a part or the whole of the shaft portion 141-2 is tapered such that its diameter gradually increases. In addition, in the present embodiment, the grooves are formed only in the spiral flow paths having an angle of 60 degrees with respect to the longitudinal direction of the flow characteristic providing portion 145 as shown in FIG. 8. In another embodiment, grooves are formed in the circular flow paths (closed paths) having an angle of 90 degrees with respect to the longitudinal direction. This modification is applicable to other embodiments which will be described later.

Now, flow of the fluid passing through the fluid supply pipe 100 is described. The fluid enters the inlet 111 of the fluid supply pipe 100 through the delivery pipe 9 (see FIG. 1) by an electric pump whose impeller rotates clockwise or counterclockwise. The fluid passes between the three vanes 143-1, 143-2, and 143-3 of the swirl generating portion 143 formed in the spiral shape. The fluid vigorously swirls due to the vanes of the swirl generating portion 143, passes the shaft portion 141-2, and flows to the flow characteristic providing portion 145.

Then, the fluid passes between the plurality of rhombic protrusions 145p of the flow characteristic providing portion 145. Since the plurality of guide channels 145r are formed between the protrusions 145p as described above, the step between the shaft portion 141-2 and the shaft portion 141-3 of the flow characteristic providing portion 145 is offset and the effect of guiding the swirling flow generated in the swirl generating portion 143 to the flow characteristic providing portion 145 is improved. Further, the grooves including the guide channels 145r and subsequent thereto allow the fluid to flow smoothly in the flow characteristic providing portion 145. The plurality of rhombic protrusions 145p form a plurality of narrow flow paths. As the fluid passes through the plurality of narrow flow paths formed by the plurality of rhombic protrusions 145p, a large number of minute vortices are generated. This causes mixing and diffusion of the fluid. The structure of the flow characteristic providing portion 145 is also useful when two or more fluids having different properties need to be mixed.

The internal structure 140 is configured such that the fluid flows from the upstream side (the swirl generating portion 143) having a large cross-sectional area to the downstream side (the flow paths formed between the plurality of rhombic protrusions 145p of the flow characteristic providing portion 145) having a small cross-sectional area in the fluid supply pipe 100. This configuration changes static pressure of the fluid as described below. The relationship between pressure, velocity, and potential energy with no external energy to a fluid is given by the Bernoulli equation.

$$p + \frac{\rho v^2}{2} + gh\rho = k$$

Here, p is the pressure at a point on a streamline, p is the density of the fluid, v is the fluid flow speed at the point, g is the gravitational acceleration, h is the height of the point with respect to a reference plane, and k is a constant. The Bernoulli's law expressed as the above equation is the energy conservation law applied to fluids and explains that the sum of all the forms of energy on a streamline is constant for flowing fluids at all times. According to the Bernoulli's law, the fluid velocity is low and the static pressure is high in the upstream side having the large cross-sectional area. On the other hand, the fluid velocity is increased and the static pressure is lowered in the downstream side having the small cross-sectional area.

In the case that the fluid is a liquid, the liquid begins to vaporize when the lowered static pressure reaches the saturated vapor pressure of the liquid. Such a phenomenon in which a liquid is rapidly vaporized because the static pressure becomes lower than the saturated vapor pressure (for water, 3000 to 4000 Pa for water) in extremely short time at almost constant temperature is called cavitation. The interior structure of the fluid supply pipe 100 of the present invention causes the cavitation phenomenon. Due to the cavitation phenomenon, the liquid is boiled with minute bubbles of a particle size less than 100 microns existing in the liquid as nuclei or many minute bubbles are generated due to isolation of dissolved gas. That is, many fine bubbles are generated while the fluid passes the flow characteristic providing portion 145. In particular, since the diameter of the shaft portion 141-3 of the flow characteristic providing portion 145 is larger than the diameter of the shaft portion 141-1 of the swirl generating portion 143, the path through which the fluid flows is sharply narrowed while the fluid passes from the swirl generating portion 143 to the flow characteristic providing portion 145, thereby amplifying the cavitation phenomenon. Further, by forming the plurality of guide channels 145r or the plurality of guide channels 145r and grooves subsequent thereto, the step due to the difference in diameter can be offset and the fluid can be smoothly guided from the swirl generating portion 143 to the flow characteristic providing portion 145. In addition, since the plurality of guide channels 145r or the plurality of guide channels 145r and grooves subsequent thereto are formed such that the velocity of the fluid does not decrease at their bottoms as described above with respect to FIG. 9, it is possible to optimize the flow in the flow characteristic providing portion 145.

In the case of water, one water molecule can form hydrogen bonds with four other water molecules, and this hydrogen bonding network is not easy to break down. Thus, the water has much higher boiling point and melting point than other liquids that do not form hydrogen bonds, and is highly viscous. Since the water having the high boiling point exhibits an excellent cooling effect, the water is frequently used as the coolant for the machine tool for performing operations such as grinding. However, the water has a problem that the size of the water molecule is large and its penetrability to a machining spot and/or lubricity is not so good. Thus, conventionally, a special lubricant (i.e. cutting oil) other than the water is frequently used alone or in combination with the water. In the case of using the fluid supply apparatus of the present invention, the cavitation phenomenon described above causes vaporization of the water and, as a result, the hydrogen bonding network of the water is destroyed to lower the viscosity. Further, the fine bubbles generated by the vaporization improve the penetrability and lubricity. The improved penetrability results in increased cooling efficiency. Therefore, according to many embodiment of the present invention, it is possible to improve machining quality (i.e. the performance of the machine tool) even if only water is used without using any special lubricant.

The fluid which has passed the flow characteristic providing unit 145 flows toward the end of the internal structure 140 through the tapered portion 136 of the outlet side member 130. The tapered portion 136 has a flow path whose cross section is much larger than that of the narrow flow paths of the flow characteristic providing portion 145. Since the fluid flows from the plurality of narrow flow paths formed by the plurality of protrusions of the flow characteristic providing portion 145 to the tapered portion 136 of the outlet side member 130, a path through which the fluid flows is rapidly widened. The, the fluid flows out of the outlet 112, and is discharged toward the grinding spot G through the nozzle 6. When the fluid is discharged through the nozzle 6, the many fine bubbles generated by the flow characteristic providing portion 145 are exposed to atmospheric pressure. The fine bubbles collide with the grinding blade 2 and the workpiece W and break, or explode and disappear. Vibration and shock generated during the extinction of the bubbles effectively remove sludge or chips generated at the grinding spot G. In other words, the cleaning effect around the grinding spot G is improved as the fine bubbles disappear.

By providing the fluid supply unit of the machine tool with the fluid supply pipe 100 of the embodiment of the present invention, it is possible to cool the heat generated in the grinding blade and the workpiece more effectively than by using a conventional fluid supply unit. Further, the penetrability and lubricity of the fluid are improved, thereby enhancing the precision of machining. Furthermore, by effectively removing the debris of the workpiece from the machining spot, it is possible to extend the service life of the tool such as the cutting blade and reduce the cost of replacing the tool.

In addition, since the swirl generating portion 143 and the flow characteristic providing portion 145 of the internal structure 140 are formed by processing the single member according to the present embodiment, the internal structure 140 is manufactured as a single integrated component. Therefore, it is possible to manufacture the fluid supply pipe 100 only by a simple process of inserting the internal structure 140 into the outlet side member 130 and then coupling the outlet side member 130 and the inlet side member 120 (for example, by engaging the male screw 132 of the outlet side member 130 with the female screw 126 of the inlet side member 120). Further, since it is not necessary to pay much attention to the alignment and the matching of the dimensions of the swirl generating portion 143 and the flow characteristic providing portion 145, the time and cost required for machining and assembling can be reduced.

The fluid supply pipe according to some embodiments of the present invention can be applied to a machining liquid supply unit in various machine tools such as the grinding machine, the cutting machine, and the drilling machine. In addition, the fluid supply pipe can be effectively used in an apparatus for mixing two or more kinds of fluids (for example, liquid and liquid, liquid and gas, or gas and gas). For example, in the case of applying the fluid supply pipe to a combustion engine, combustion efficiency can be improved by sufficiently mixing fuel and air. Further, in the case of applying the fluid supply pipe to a cleaning apparatus, a cleaning effect can be further improved compared to a conventional cleaning apparatus. As another example, by employing the fluid supply pipe in a hydroponics system, it is possible to increase dissolved oxygen in water supplied by the system to maintain or raise the oxygen amount (i.e. dissolved oxygen concentration) in the water.

Second Embodiment

Figure 10:
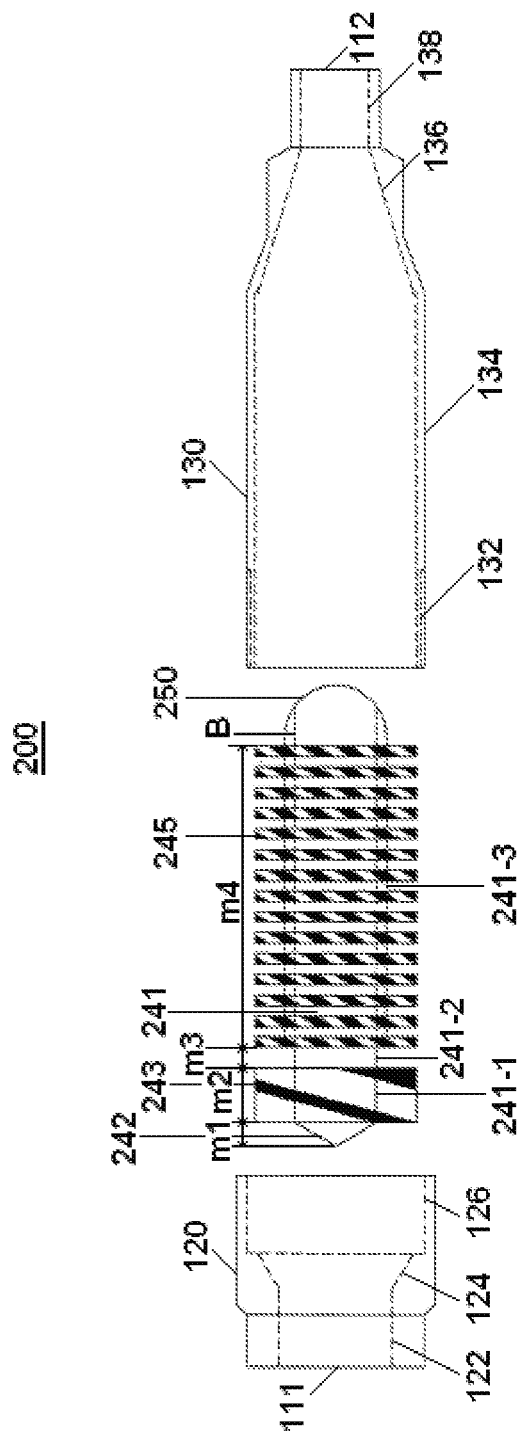
FIG. 10 is a side exploded view of a fluid supply pipe according to a second embodiment of the present invention.
Figure 11:
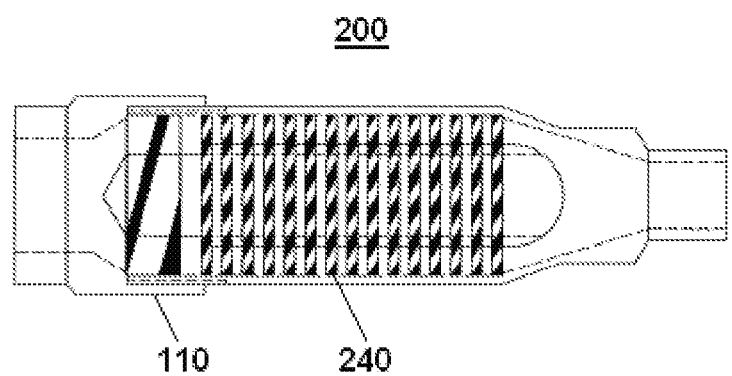
FIG. 11 is a side sectional view of the fluid supply pipe according to the second embodiment of the present invention.

Referring to FIGS. 10 and 11, a fluid supply pipe 200 according to a second embodiment of the present invention will be described below. Descriptions of the same features as those of the first embodiment will be omitted, and only differences from the first embodiment will be described in detail. The same reference numerals are used for the same features as those of the first embodiment. FIG. 10 is a side exploded view of the fluid supply pipe 200 according to the second embodiment of the present invention, and FIG. 11 is a side sectional view of the fluid supply pipe 200. As shown in FIGS. 10 and 11, the fluid supply pipe 200 includes the pipe body 110 and an internal structure 240. Since the pipe body 110 of the second embodiment is the same as that of the first embodiment, descriptions thereof will be omitted. In FIGS. 10 and 11, a fluid flows from the inlet 111 to the outlet 112. As shown in FIG. 11, the fluid supply pipe 200 is assembled by inserting the internal structure 240 into the outlet side member 130 and then engaging the male screw 132 of the outer circumferential surface of the outlet side member 130 with the female screw 126 of the inner circumferential surface of the inlet side member 120.

The internal structure 240 of the second embodiment includes a fluid diffusing portion 242, a swirl generating portion 243, a flow characteristic providing portion 245, and a guiding portion 250, from the upstream side to the downstream side, which are formed integrally on a common shaft member 241 having a circular cross-section. For example, the internal structure 240 is formed by machining one cylindrical member. In the present embodiment, the shaft member 241 has the same diameter at a shaft portion 241-1 of the swirl generating portion 243 and a shaft portion 241-2. The diameter of a shaft portion 241-3 of the flow characteristic providing portion 245 is larger than the diameter of the shaft portions 241-1 and 241-2. The dashed line B indicates the position of the bottom surface (for example, the vertex) of the groove (for example, the V-shaped groove, the R-shaped groove, the trapezoidal groove, or any other polygonal groove). Each of the swirl generating portion 243 and the flow characteristic providing portion 245 has a similar structure and can be formed by a similar method as each of the swirl generating portion 143 and the flow characteristic providing portion 145 of the first embodiment, respectively.

In the present embodiment, the fluid diffusing portion 242 has a cone shape. For example, the fluid diffusing portion 242 is formed by machining one end of the cylindrical member in a cone shape. The fluid diffusing portion 242 diffuses the fluid flowing into the inlet side member 120 through the inlet 111 outward from the center of the pipe, i.e. radially. When the internal structure 240 is housed in the pipe body 110, the fluid diffusing portion 242 is placed at a position corresponding to the tapered portion 124 of the inlet side member 120 (see FIGS. 10 and 11). Although the fluid diffusing portion 242 has the cone shape in the present embodiment, the present invention is not limited this embodiment. In another embodiment, the fluid diffusing portion 242 is formed in a dome shape. The fluid diffusing portion 242 may have any other shape that is gradually enlarged concentrically from an apex. In another embodiment, the internal structure 240 has no fluid diffusing portion. These modifications are applicable to other embodiments which will be described later.

The swirl generating portion 243 corresponds to a part or the whole of a head portion of the internal structure 240 which is placed in the upstream side of the pipe body 110 when the internal structure 140 is housed in the pipe body 110. The length of the shaft portion 241-1 of the swirl generating portion 243 (m2) is longer than the length of the fluid diffusing portion 242 (m1) and is shorter than the length of the shaft portion 241-3 of the flow characteristic providing portion 245 (m4). The length of the shaft portion 241-2 (m3) between the swirl generating portion 243 and the flow characteristic providing portion 245 is shorter than the length of the fluid diffusing portion 242 (m1). The diameter of the portion of the fluid diffusing portion 242 of which cross-sectional area is the maximum is the same as the diameter of the shaft portion 241-1 of the swirl generating portion 243 in the present embodiment. In another embodiment, the diameter of the portion of the fluid diffusing portion 242 of which cross-sectional area is the maximum is smaller than the diameter of the shaft portion 241-1. In further another embodiment, the diameter of the portion of the fluid diffusing portion 242 of which cross-sectional area is the maximum is larger than the diameter of the shaft portion 241-1. In this case, it is preferable that the radius of the portion of the fluid diffusing portion 142 of which cross-sectional area is the maximum is smaller than the radius of the swirl generating portion 243 (i.e. the distance from the center of the shaft portion 241-1 to the end of each vane of the swirl generating portion 243). These modifications are applicable to embodiments which will be described later.

The fluid entering the fluid supply pipe 200 is diffused by the fluid diffusing portion 242 and passes between one or more vanes of the swirl generating portion 243. In the present embodiment, the swirl generating portion 243 includes a shaft portion 241-1 having a circular cross-section and three spiral vanes. The shaft portion 241-1 has a diameter constant along the longitudinal direction of the shaft member 241. The fluid diffusing portion 242 induces the fluid flowing into the fluid supply pipe 200 through the delivery pipe 9 to enter between the vanes of the swirl generating portion 243 effectively. The fluid vigorously swirls by the vanes of the swirl generating portion 243 and then flows to the flow characteristic providing portion 245.

Similarly to the first embodiment, the flow characteristic providing portion 245 includes the shaft portion 241-3 having a circular cross-section and a plurality of protrusions protruding from the outer circumferential surface of the shaft portion 241-3. The shaft portion 241-3 has a diameter constant along the longitudinal direction of the shaft member 241. The flow characteristic providing portion 245 is formed downstream from the swirl generating portion 243 and corresponds to a part or the whole of a body portion of the internal structure 240. In the present embodiment, the diameter of the shaft portion 241-3 of the flow characteristic providing portion 245 is larger than the diameter of the shaft portion 241-1 of the swirl generating portion 243 and the shaft portion 241-2. A plurality of grooves are formed on the outer circumferential surface of the shaft portion 241-3 so as to spirally extend from one end to the other end of the shaft portion 241-3 along the circumference of the shaft portion 241-3. Each of the grooves functions as a guide channel for guiding the fluid at the upstream side of the flow characteristic providing portion 245. The grooves are V-shaped (FIG. 6A), R-shaped (FIG. 6B), trapezoidal (FIG. 6C), or in a different polygonal shape, and form guide channels and grooves subsequent thereto to guide the fluid to flow between the plurality of protrusions. Due to the above-described structure, an enough flow rate of the fluid flows into the swirl generating portion 243 and the turning force of the fluid induced by the swirl generating portion 243 becomes sufficiently strong. The cross-sectional area of a path through which the fluid flows narrows is sharply reduced while the fluid flows from the swirl generating portion 243 to the flow characteristic providing portion 245, thereby increasing the cavitation phenomenon and the effect of generation of the fine bubbles caused by the flow characteristic providing portion 245. In addition, although a step exists between the swirl generating portion 243 and the flow characteristic providing portion 245 due to the difference in diameter of their shaft portions, the guide channels guide the fluid smoothly to the flow characteristic providing portion 245 and the subsequent grooves prevent the fluid velocity from being undesirably decreased.

Since the fluid flows from a plurality of narrow flow paths formed by the plurality of protrusions of the flow characteristic providing portion 245 to the tapered portion 136 of the outlet side member 130, a path through which the fluid flows is rapidly widened. At this time, the dome-shaped guiding portion 250 of the internal structure 240 causes a Coanda effect. The Coanda effect is the phenomenon in which a fluid flowing around a curved surface is drawn to the curved surface due to a pressure drop between the fluid and the curved surface and thus the fluid flows along the curved surface. Due to the Coanda effect, the fluid is guided to flow along the surface of the guiding portion 250. The fluid guided by the dome-shaped guiding portion 250 toward the center of the pipe passes the tapered portion 136 and flows out of the outlet 112. The fine bubbles generated by the flow characteristic providing portion 245 improve the cooling function and the cleaning effect of the fluid compared with a conventional pipe.

The guiding portion 250 is formed by machining the downstream end of the cylindrical member in a dome shape, for example. The guiding portion 250 guides the fluid flowing inside the fluid supply pipe 200 toward the center of the fluid supply pipe 200 so that the fluid can be smoothly discharged through the outlet 112, as described above. The present invention is not limited to this embodiment. In another embodiment, the guiding portion 250 is formed in a cone shape. In further another embodiment, the internal structure 240 includes no guiding portion. These modifications are applicable to other embodiments described here.

Third Embodiment

Figure 12:
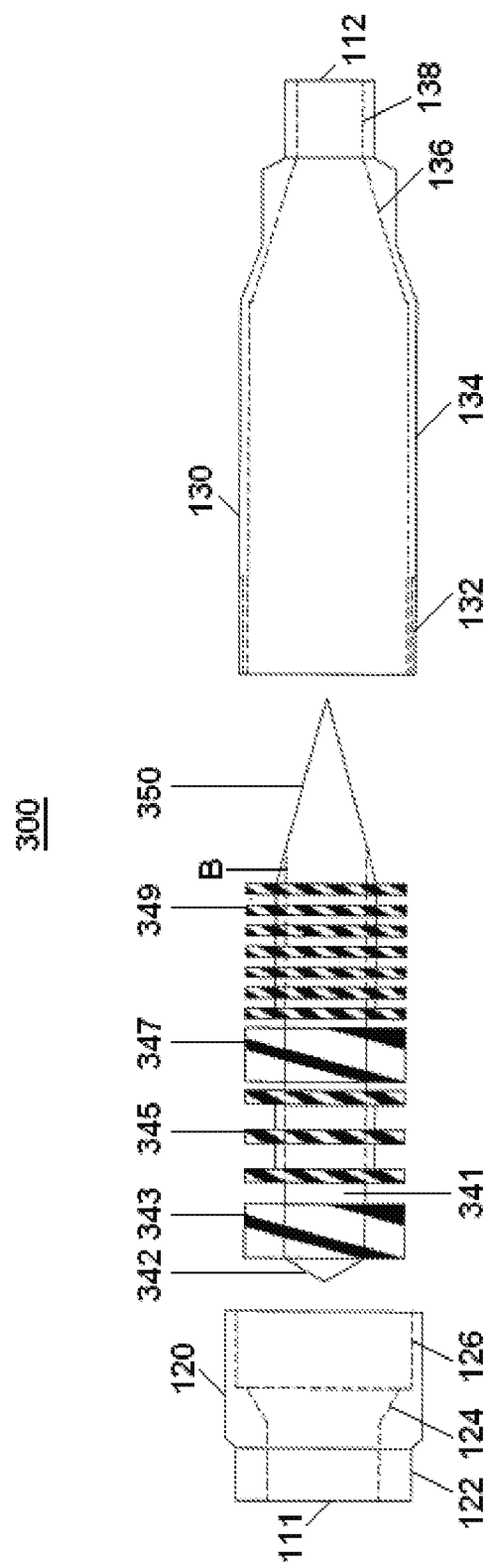
FIG. 12 is a side exploded view of a fluid supply pipe according to a third embodiment of the present invention.
Figure 13:
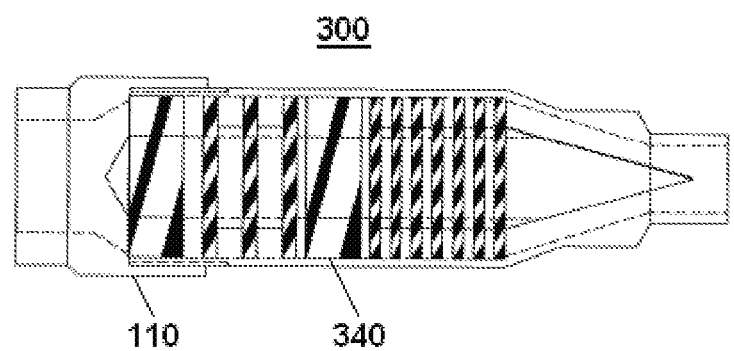
FIG. 13 is a side sectional view of the fluid supply pipe according to the third embodiment of the present invention.

Referring to FIGS. 12 and 13, a fluid supply pipe 300 according to a third embodiment of the present invention will be described below. Descriptions of the same features as those of the first embodiment will be omitted, and only differences from the first embodiment will be described in detail. The same reference numerals are used for the same features as those of the first embodiment. FIG. 12 is a side exploded view of the fluid supply pipe 300 according to the third embodiment of the present invention, and FIG. 13 is a side sectional view of the fluid supply pipe 300.

As shown in FIGS. 12 and 13, the fluid supply pipe 300 includes the pipe body 110 and an internal structure 340. Since the pipe body 110 of the third embodiment is the same as that of the first embodiment, descriptions thereof will be omitted. In FIGS. 12 and 13, a fluid flows from the inlet 111 to the outlet 112. As shown in FIG. 13, the fluid supply pipe 300 is assembled by inserting the internal structure 340 into the outlet side member 130 and then engaging the male screw 132 of the outer circumferential surface of the outlet side member 130 with the female screw 126 of the inner circumferential surface of the inlet side member 120.

The internal structure 340 of the third embodiment includes a fluid diffusing portion 342, a first swirl generating portion 343, a first flow characteristic providing portion 345, a second swirl generating portion 347, a second flow characteristic providing portion 349, and a conical guiding portion 350, from the upstream side to the downstream side, which are formed integrally on a common shaft member 341 having a circular cross-section. The internal structure 340 can be formed by processing a cylindrical member made of metal such as steel or by molding plastic, for example. The fluid diffusing portion 342 has a similar structure and can be formed by a similar method as the fluid diffusing portion 242 of the second embodiment. The first swirl generating portion 343 corresponds to a part or the whole of a head portion of the internal structure 340 which is placed in the upstream side of the pipe body 110 when the internal structure 340 is housed in the pipe body 110. Each of the first swirl generating portion 343 and the second swirl generating portion 347 has a similar structure and can be formed by a similar method as the swirl generating portion 143 of the first embodiment. Each of the first flow characteristic providing portion 345 and the second flow characteristic providing portion 349 has a similar structure (see FIGS. 5A and 5B) and can be formed by a similar method (see FIG. 8) as the flow characteristic providing portion 145 of the first embodiment.

The guiding portion 350 is formed by machining the downstream end of the cylindrical member in a cone shape, for example. The guiding portion 350 guides the fluid flowing inside the fluid supply pipe 300 toward the center of the fluid supply pipe 300 so that the fluid can be smoothly discharged through the outlet 112.

As shown in FIG. 12, the diameter of a shaft portion of the first flow characteristic providing portion 345 is larger than the diameter of a shaft portion of the first swirl generating portion 343, and the diameter of a shaft portion of the second flow characteristic providing portion 349 is larger than the diameter of a shaft portion of the second swirl generating portion 347. In the present embodiment, the diameter of the shaft portion of the first swirl generating portion 343 is the same as the diameter of the shaft portion of the second swirl generating portion 347. Further, the diameter of the shaft portion of the first flow characteristic providing portion 345 is the same as the diameter of the shaft portion of the second flow characteristic providing portion 349. Thus, an enough flow rate of the fluid flows into each of the first swirl generating portion 343 and the second swirl generating portion 347 and the turning force of the fluid induced by each of the first swirl generating portion 343 and the second swirl generating portion 347 becomes sufficiently strong. The cross-sectional area of paths through which the fluid flows narrows sharply while the fluid flows from the first swirl generating portion 343 to the first flow characteristic providing portion 345 and flows from the second swirl generating portion 347 to the second flow characteristic providing portion 349, thereby amplifying the cavitation phenomenon. This increases the bubble generating effect of the fluid supply pipe 300 and consequently improves the cooling function and the cleaning effect of the fluid.

As described above, a plurality of grooves (for example, five grooves) are formed on the first flow characteristic providing portion 345 so as to spirally extend from one end to the other end of the shaft portion of the first flow characteristic providing portion 345 along the circumference of the shaft portion. Similarly, a plurality of grooves (for example, twelve grooves) are formed on the second flow characteristic providing portion 349 so as to spirally extend from one end to the other end of the shaft portion of the second flow characteristic providing portion 349 along the circumference of the shaft portion. Each of the plurality of grooves formed on the first flow characteristic providing portion 345 and the second flow characteristic providing portion 349 functions as a guide channel for guiding the fluid. The first flow characteristic providing portion 345 has a significantly smaller number of rhombic protrusions than the second flow characteristic providing portion 349, and intervals between the rhombic protrusions of the first flow characteristic providing portion 345 is wider than those of the second flow characteristic providing portion 349. Each of spiral-shaped flow paths between the plurality of rhombic protrusions of the first flow characteristic providing portion 345 is wider than each of spiral-shaped flow paths between the plurality of rhombic protrusions of the second flow characteristic providing portion 349. The number of the flow paths between the plurality of rhombic protrusions of the first flow characteristic providing portion 345 is smaller than the number of the flow paths between the plurality of rhombic protrusions of the second flow characteristic providing portion 349. By this, changes in the flow characteristics of the fluid (for example, generation of the fine bubbles due to the cavitation effect) occur more significantly at the second flow characteristic providing portion 349, i.e. at the outlet side. Such a structure improves the cooling function and the cleaning effect of the fluid due to the significant changes in the flow characteristics of the fluid caused by the plurality of rhombic protrusions located in the outlet side, while lowering the processing cost. The present invention is not limited to this embodiment. In another embodiment, only one of the first flow characteristic providing portion 345 and the second flow characteristic providing portion 349 is provided with one or more guide channel or one or more guide channels and grooves subsequent thereto. In this case, it is preferable that the shaft portion of the flow characteristic providing portion in which no guide channel and/or no groove is formed has the same diameter as the shaft portion of the swirl generating portion positioned upstream from the flow characteristic providing portion or a shaft portion between the swirl generating portion and the flow characteristic providing portion is tapered. In further another embodiment, the number of the rhombic protrusions of the first flow characteristic providing portion 345 is the same as the number of the rhombic protrusions of the second flow characteristic providing portion 349. Alternately, intervals between the rhombic protrusions of the first flow characteristic providing portion 345 may be the same as those of the second flow characteristic providing portion 349.

In FIG. 12, the dashed line B indicates the position of the bottom surface of the groove (for example, the vertex of the "V"). In the present embodiment, the depth of the groove is determined as the difference between the radius of the shaft portions of the first and second flow characteristic providing portion 345 and 349 and the radius of the shaft portions of the first and second swirl generating portions 343 and 347. By this, in spite of a step due to the difference in radius between the shaft portions of the first swirl generating portion 343 and the first flow characteristic providing portion 345 and a step due to the difference in radius between the shaft portions of the second swirl generating portion 347 and the second flow characteristic providing portion 349 (in other words, by offsetting the differences in radius), the fluid can be smoothly guided toward the first flow characteristic providing portion 345 and the second flow characteristic providing portion 349. In addition, the groove subsequent to the guide channel helps the fluid flow at a proper velocity. The present invention is not limited to this embodiment. The depth of the groove is sufficient to completely or partially offset the difference in diameter between the shaft portions so that the fluid can be smoothly guided from the first swirl generating portion 343 to the first flow characteristic providing portion 345 and from the second swirl generating portion 347 to the second flow characteristic providing portion 349. In another embodiment, the guide channel is formed such that the depth of the groove is (the radius of the shaft portion of the first flow characteristic providing portion 345—the radius of the shaft portion of the first swirl generating portion 343) at the upstream end of the first flow characteristic providing portion 345 and the groove becomes gradually shallower so that the depth is zero at a predetermined point. In other words, the guide channel is formed in a tapered shape from the upstream end to the predetermined point of the first flow characteristic providing portion 345. This modification is applicable to the second flow characteristic providing portion 349 of the present embodiment and other embodiments.

While the fluid diffusing portion 342 has the cone shape in the present embodiment, the present invention is not limited thereto. In another embodiment, the fluid diffusing portion 342 is formed in a dome shape. In further another embodiment, the internal structure 340 includes no fluid diffusing portion. Further, the guiding portion 350 has the cone shape in the present embodiment. However, the present invention is not limited thereto. In another embodiment, the guiding portion 350 is formed in a dome shape. In further another embodiment, the internal structure 340 includes no guiding portion.

Now, flow of the fluid passing through the fluid supply pipe 300 is described. The fluid enters the inlet 111 of the fluid supply pipe 300 through the delivery pipe 9 (see FIG. 1) bumps into the fluid diffusing portion 342 and diffuses outward from the center of the fluid supply pipe 300 (i.e. radially) while passing through the inner space of the tapered portion 124 of the inlet side member 120. The diffused fluid passes between three vanes of the first swirl generating portion 343 formed in the spiral shape. The fluid vigorously swirls due to the vanes of the first swirl generating portion 343 and flows to the first flow characteristic providing portion 345. Then, the fluid passes through the plurality of narrow flow paths formed by the plurality of rhombic protrusions of the first flow characteristic providing portion 345. Since the diameter of the shaft portion of the first flow characteristic providing portion 345 is larger than the diameter of the shaft portion of the first swirl generating portion 343, the path through which the fluid flows narrows sharply while the fluid flows from the first swirl generating portion 343 to the first flow characteristic providing portion 345. In spite of the step due to the difference in diameter between the shaft portions of the first swirl generating portion 343 and the first flow characteristic providing portion 345, the fluid is smoothly guided toward the first flow characteristic providing portion 345 by the plurality of guide channels formed on the first flow characteristic providing portion 345 and the fluid velocity does not significantly decrease even at the bottoms of the flow paths throughout the first flow characteristic providing portion 345 due to the subsequent grooves. Due to the structure of the first flow characteristic providing portion 345, a large number of minute vortices generate in the fluid and the cavitation phenomenon occurs. As a result, the fine bubbles are generated.

Then, the fluid passes between the three spiral vanes of the second swirl generating portion 347 and vigorously swirls due to the vanes. Since the diameter of the shaft portion of the second swirl generating portion 347 is smaller than the diameter of the shaft portion of the first flow characteristic providing portion 345, an enough flow rate of the fluid flows into the second swirl generating portion 347 and the turning force of the fluid by the second swirl generating portion 347 becomes sufficiently strong. The swirling flow of the fluid is sent to the second flow characteristic providing portion 349. Since the diameter of the shaft portion of the second flow characteristic providing portion 349 is larger than the diameter of the shaft portion of the second swirl generating portion 347, the path through which the fluid flows is sharply narrowed while the fluid flows from the second swirl generating portion 347 to the second flow characteristic providing portion 349. In spite of the step due to the difference in diameter between the shaft portions of the second swirl generating portion 347 and the second flow characteristic providing portion 349, the fluid is smoothly guided toward the second flow characteristic providing portion 349 by the plurality of guide channels formed on the second flow characteristic providing portion 349 and the fluid velocity does not significantly decrease even at the bottoms of the flow paths throughout the second flow characteristic providing portion 349 due to the subsequent grooves. Due to the above described structure, a large number of minute vortices are generated and the cavitation phenomenon occurs. As a result, the fine bubbles are generated in the fluid.

The fluid which has passed the second flow characteristic providing portion 349 flows toward the end of the internal structure 340 and is guided to the center of the fluid supply pipe 300 along the surface of the guiding portion 350. The fluid passes the tapered portion 136 of the outlet side member 130 and flows out of the outlet 112. By the above described structure of the internal structure 340, the enough flow rate of the fluid flows into each of the first and second swirl generating portions 343 and 347 and the turning force of the fluid by the first and second swirl generating portions 343 and 347 becomes sufficiently strong. In addition, when the fluid enters the first flow characteristic providing portion 345 and the second flow characteristic providing portion 349, the flow paths of the fluid are sharply narrowed. As a result, the cavitation phenomenon can be amplified. The plurality of guide channels formed on the first and second flow characteristic providing portions 345 and 349 guide the fluid smoothly and the subsequent grooves prevent the fluid velocity from being significantly decreased. By the two swirl generating portions and two flow characteristic providing portions of the internal structure 340 of the fluid supply pipe 300, the plurality of fine bubbles are contained in the fluid discharged through the outlet 112 toward the workpiece W and the grinding blade 2. As described above, the fine bubbles decrease the surface tension of the fluid and thus the lubricity and penetrability are improved. Thus, it is possible to improve the cooling function and the cleaning effect of the fluid. In addition, the swirling flow generated by the internal structure 340 causes mixture and diffusion, which is also useful when mixing two or more fluids having different properties.

In the third embodiment, the internal structure is configured to include the two swirl generating portions and the two flow characteristic providing portions. However, according to another embodiment, an internal structure may have three or more swirl generating portions and three or more flow characteristic providing portions. In this case, the shaft member of the internal structure may have a larger diameter at each of the flow characteristic providing portions than at the swirl generating portion upstream thereof and the guide channels and subsequent grooves may be formed on all of the flow characteristic providing portions. Alternately, the shaft portion of only one flow characteristic providing portion (for example, the flow characteristic providing portion at the most downstream side) may have a diameter larger than that of the shaft portion of the swirl generating portion upstream thereof and the guide channels and subsequent grooves may be formed on the only one flow characteristic providing portion.

Fourth Embodiment

Figure 14:
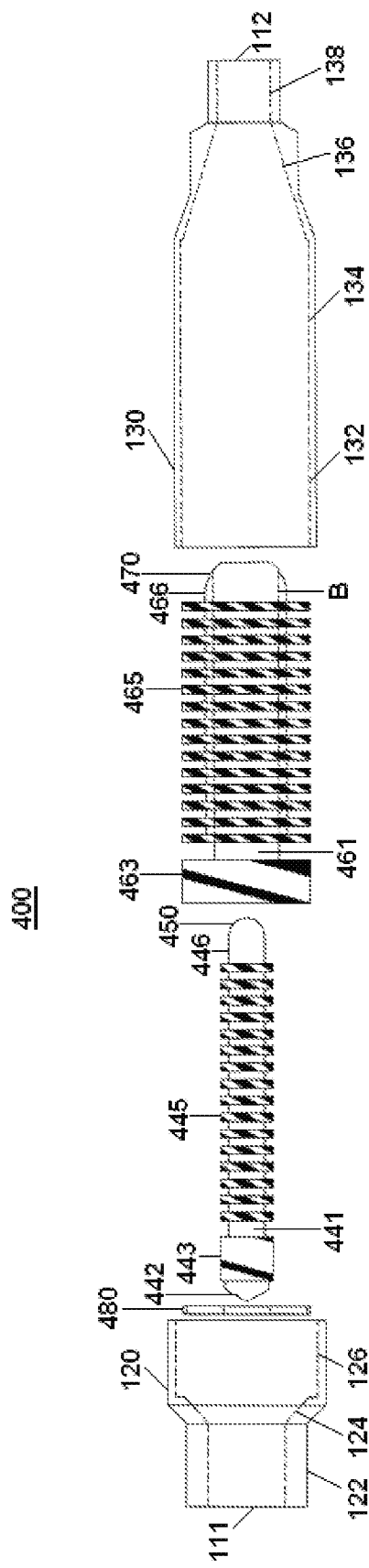
FIG. 14 is a side exploded view of a fluid supply pipe according to a fourth embodiment of the present invention.
Figure 15:
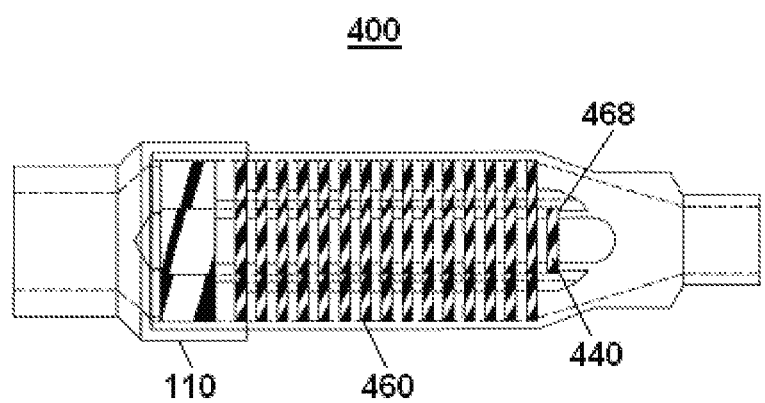
FIG. 15 is a side sectional view of the fluid supply pipe according to the fourth embodiment of the present invention.
Figure 16:
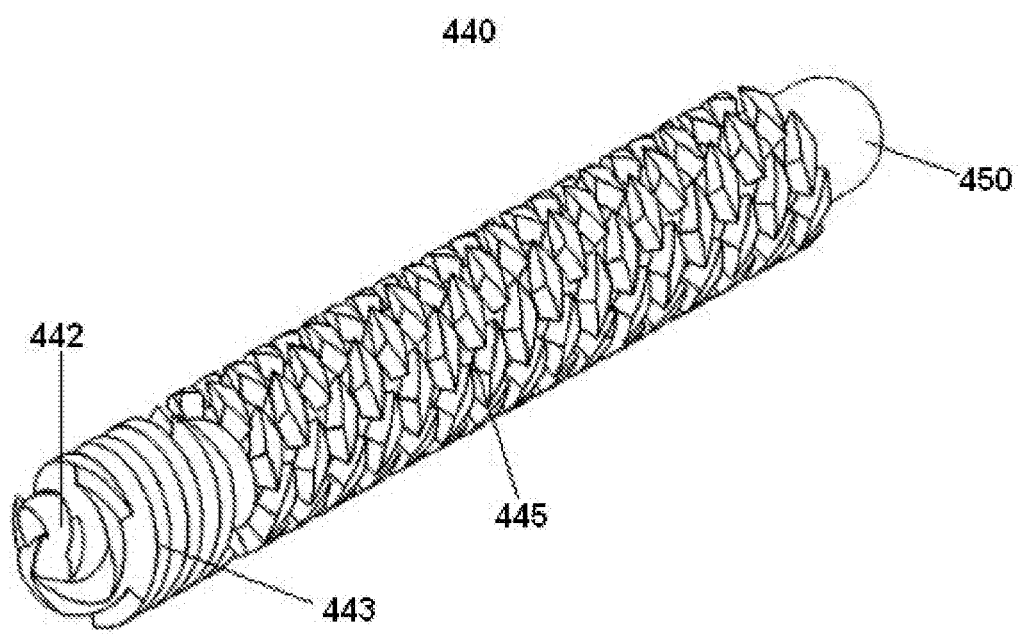
FIG. 16 is a three-dimensional view of a first internal structure of the fluid supply pipe according to the fourth embodiment of the present invention.
Figure 17:
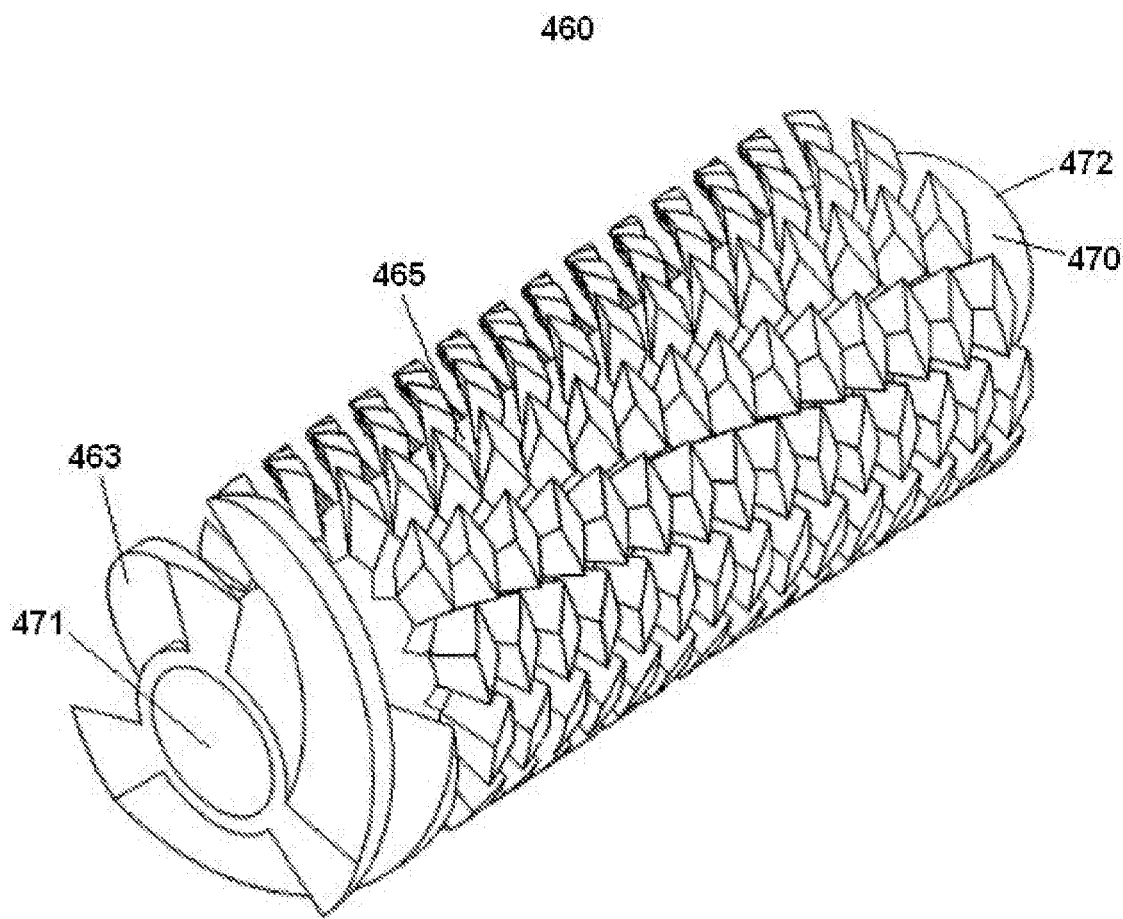
FIG. 17 is a three-dimensional view of a second internal structure of the fluid supply pipe according to the fourth embodiment of the present invention.

Referring to FIGS. 14 to 17, a fluid supply pipe 400 according to a fourth embodiment of the present invention will be described below. Descriptions of the same features as those of the first embodiment will be omitted, and only differences from the first embodiment will be described in detail. The same reference numerals are used for the same features as those of the first embodiment. FIG. 14 is a side exploded view of the fluid supply pipe 400 according to the fourth embodiment of the present invention, and FIG. 15 is a side sectional view of the fluid supply pipe 400. FIG. 16 is a three-dimensional view of a first internal structure 440 of the fluid supply pipe 400, and FIG. 17 is a three-dimensional view of a second internal structure 460 of the fluid supply pipe 400. Since the pipe body 110 of the fourth embodiment is the same as that of the first embodiment, descriptions thereof will be omitted. In FIGS. 14 and 15, a fluid flows from the inlet 111 to the outlet 112.

The fluid supply pipe 400 includes the second internal structure 460 in the form of a hollow shaft housed in the pipe body 110 and the first internal structure 440 housed in a hollow of the second internal structure 460. The fluid supply pipe 400 is assembled by housing the first internal structure 440 and the second internal structure 460 in the outlet side member 130 after inserting the first internal structure 440 into the hollow of the second internal structure 460, placing a press plate 480 at the head of the second internal structure 460, and then engaging the male screw 132 of the outer circumferential surface of the outlet side member 130 with the female screw 126 of the inner circumferential surface of the inlet side member 120. The fluid flowing into the fluid supply pipe 400 through the inlet 111 is divided and flows into the hollow of the second internal structure 460 and the inside of the outlet side member 130.

The first internal structure 440 can be formed by processing a cylindrical member made of metal such as steel or by molding plastic, for example. As shown in FIGS. 14 and 16, the first internal structure 440 includes a fluid diffusing portion 442, a first swirl generating portion 443, a first flow characteristic providing portion 445, and a first guiding portion 450, from the upstream side to the downstream side, which are formed integrally on a common shaft member 441 having a circular cross-section. The first swirl generating portion 443 corresponds to a part or the whole of a head portion of the first internal structure 440, and the first flow characteristic providing portion 445 corresponds to a part or the whole of a body portion of the first internal structure 440.

The head portion of the first internal structure 440 is placed in the upstream side of the pipe body 110 when the first internal structure 440 is housed in the pipe body 110 and the body portion of the first internal structure 440 is positioned downstream from the head portion. In the case of producing the first internal structure 440 by machining the cylindrical member, the fluid diffusing portion 442 is formed by machining one end of the cylindrical member in a cone shape. The fluid diffusing portion 442 diffuses the fluid flowing into the inlet side member 120 through the inlet 111 outward from the center of the pipe, i.e. radially. While the fluid diffusing portion 442 has the cone shape in the present embodiment, the present invention is not limited thereto and the fluid diffusing portion 442 may have a different shape. In an embodiment, the fluid diffusing portion 442 is formed in a dome shape.

The first swirl generating portion 443 of the first internal structure 440 has a similar structure and can be formed by a similar method as the swirl generating portion 143 of the first embodiment. The first swirl generating portion 443 includes a shaft portion having a circular cross-section and three spiral vanes. The shaft portion of the first swirl generating portion 443 has a diameter constant along the longitudinal direction of the shaft member 441. The length of the shaft portion of the first swirl generating portion 443 is longer than the length of the fluid diffusing portion 442 and is shorter than the length of a shaft portion of the first flow characteristic providing portion 445, in the present embodiment. The diameter of a portion of the fluid diffusing portion 442 of which cross-sectional area is the maximum is the same as the diameter of the shaft portion of the first swirl generating portion 443. It is desirable that the radius of the portion of the fluid diffusing portion 442 of which cross-sectional area is the maximum is smaller than the distance from the center of the shaft portion of the first swirl generating portion 443 to the end of each vane. Each of the vanes of the first swirl generating portion 443 has its end spaced by 120 degrees from each other in the circumferential direction of the shaft portion. The vanes are formed in a spiral shape in the counterclockwise direction at a predetermined interval on the outer circumferential surface from one end to the other end of the shaft portion of the first swirl generating portion 443. The number of the vanes is three in the present invention, but the present invention is not limited this embodiment. Further, the shape of the vanes of the first swirl generating portion 443 is not particularly limited if the vanes can cause swirling flow of the fluid which has been diffused by the fluid diffusing portion 442 and has flowed into the first swirl generating portion 443 while the fluid passes between the vanes. In the present embodiment, the outer diameter of the first swirl generating portion 443 is such that it is close to the inner circumferential surface of the second internal structure 460 when the first internal structure 440 is housed in the hollow of the second internal structure 460.

Figure 18:
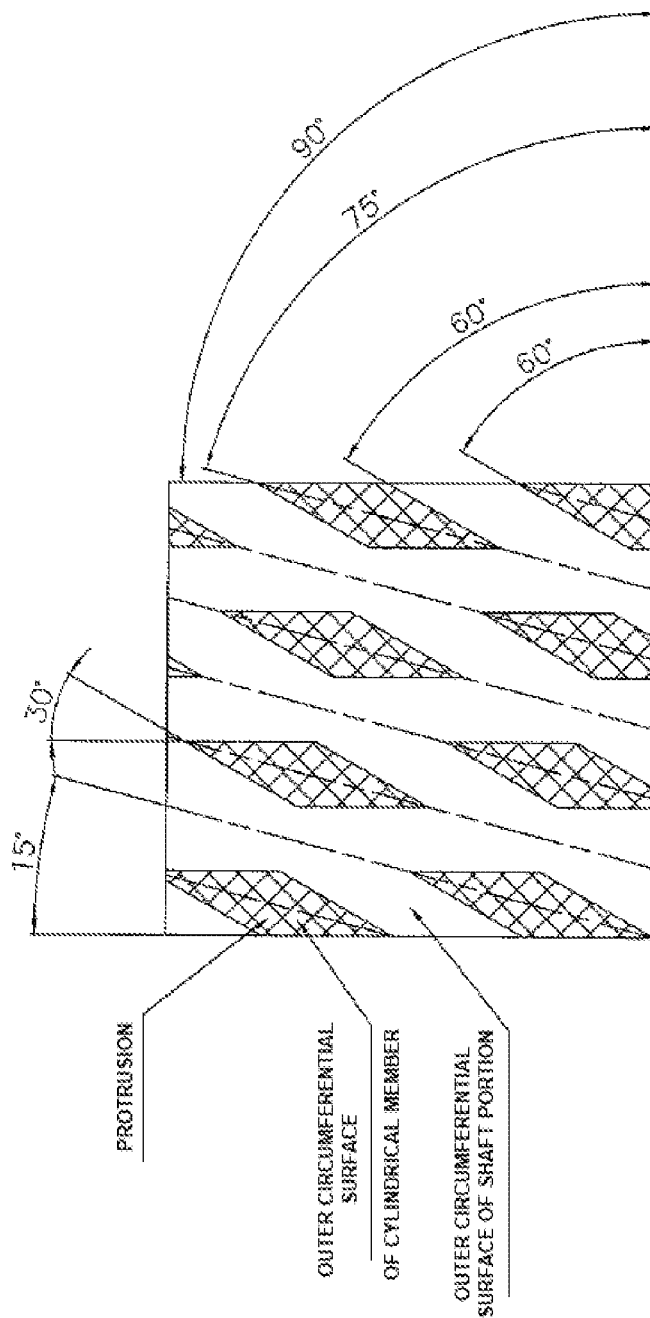
FIG. 18 is a drawing for explaining an exemplary method for forming a flow characteristic providing portion of the first internal structure of the fluid supply pipe according to the fourth embodiment of the present invention.

The first flow characteristic providing portion 445 of the first internal structure 440 is formed downstream from the fluid diffusing portion 442 and the first swirl generating portion 443. As shown in FIGS. 14 and 16, the first flow characteristic providing portion 445 includes the shaft portion having a circular cross-section and a plurality of protrusions protruding from the outer circumferential surface of the shaft portion. The shaft portion has a diameter constant along the longitudinal direction of the shaft member 441. Each of the plurality of protrusions is in the form of a pillar having a rhombic cross-section and the plurality of protrusions are formed in a net shape. Each of the plurality of rhombic protrusions is formed, for example, by grinding the cylindrical member so as to protrude outward radially from the outer circumferential surface of the shaft portion. An exemplary method for forming the first flow characteristic providing portion 445 is shown in FIG. 18. A plurality of lines with predetermined spacing therebetween in the direction of 90 degrees with respect to the longitudinal direction of the cylindrical member and a plurality of lines having a predetermined angle (for example, 60 degrees) with respect to the longitudinal direction with predetermined spacing therebetween are intersected with each other. Spaces between the lines in the direction of 90 degrees are ground alternately, and spaces between the tilted lines are ground alternately. By this, the plurality of rhombic protrusions protruding from the outer circumferential surface of the shaft portion are formed regularly and alternately in the vertical direction (the circumferential direction of the shaft portion) and the horizontal direction (the longitudinal direction of the shaft portion). Unlike the flow characteristic providing portion 145 of the first embodiment, the first flow characteristic providing portion 445 of the present embodiment includes neither guide channels nor grooves subsequent thereto and the diameter of the shaft portion of the first flow characteristic providing portion 445 is the same as the diameter of the shaft portion of the first swirl generating portion 443. In another embodiment, the diameter of the shaft portion of the first flow characteristic providing portion 445 is larger than the diameter of the shaft portion of the first swirl generating portion 443 and a plurality of guide channels and grooves subsequent thereto are formed between the plurality of protrusions of the first flow characteristic providing portion 445. In the present embodiment, the outer diameter of the first flow characteristic providing portion 445 is such that it is close to the inner circumferential surface of the second internal structure 460 when the first internal structure 440 is housed in the hollow of the second internal structure 460. The shape of the cross-section of the protrusion may be a triangle or another polygon.

While the diameter of the shaft portion of the first flow characteristic providing portion 445 is the same as the diameter of the shaft portion of the first swirl generating portion 443, the present invention is not limited thereto. In another embodiment, the diameter of the shaft portion of the first swirl generating portion 443 is smaller than the diameter of the shaft portion of the first flow characteristic providing portion 445 and there is a tapered portion with a gradually increasing diameter between the them.

The first guiding portion 450 of the first internal structure 440 can be formed, for example, by machining the downstream end of the cylindrical member in a dome shape. As shown in FIG. 14, the shaft portion of the first flow characteristic providing portion 445 is extended between the first flow characteristic providing portion 445 and the first guiding portion 450. In the present embodiment, the length of this shaft extension portion 446 is determined such that the first guiding portion 450 of the first internal structure 440 protrudes out of the second internal structure 460 when the first internal structure 440 is housed in the hollow of the second internal structure 460. In one example, the length of the shaft extension portion 446 is the same as the length of a second guiding portion 470 of the second internal structure 460. While the first guiding portion 450 has the dome shape in the present embodiment, the present invention is not limited thereto and the first guiding portion 450 may have a different shape (for example, a cone shape). In another embodiment, the first internal structure 440 includes no guiding portion.

The second internal structure 460 has the hollow shaft shape, and can be formed by processing a cylindrical member made of metal such as steel or by molding plastic, for example. As shown in FIGS. 14 and 17, the second internal structure 460 includes a second swirl generating portion 463, a second flow characteristic providing portion 465, and the second guiding portion 470, from the upstream side to the downstream side, which are formed integrally on a common hollow shaft member 461. The second swirl generating portion 463 corresponds to a part or the whole of a head portion of the second internal structure 460, and the second flow characteristic providing portion 465 corresponds to a part or the whole of a body portion of the second internal structure 460. The head portion of the second internal structure 460 is placed in the upstream side of the pipe body 110 when the second internal structure 460 is housed in the pipe body 110 and the body portion of the second internal structure 460 is positioned downstream from the head portion. In the present embodiment, the inner diameter of the second internal structure 460 (in other words, the diameter of the hollow of the second internal structure 460) is bigger on the side of its inlet than on the side of its outlet. As shown in FIGS. 15 and 17, the first internal structure 440 is inserted through an inlet 471 of the hollow of the second internal structure 460 and the first guiding portion 450 of the first internal structure 440 protrudes out of the second internal structure 460 through an outlet 472 of the hollow of the second internal structure 460.

The second swirl generating portion 463 of the second internal structure 460 has a similar structure and can be formed by a similar method as the swirl generating portion 143 of the first embodiment. The second swirl generating portion 463 includes a shaft portion having a circular cross-section and three spiral vanes. The shaft portion of the second swirl generating portion 463 has a diameter constant along the longitudinal direction of the shaft member 461. In the case of producing the second internal structure 460 by machining the cylindrical member, the second swirl generating portion 463 is formed by machining one end of the cylindrical member. Each of the vanes of the second swirl generating portion 463 has its end spaced by 120 degrees from each other in the circumferential direction of the shaft portion. The vanes are formed in a spiral shape in the counterclockwise direction at a predetermined interval on the outer circumferential surface from one end to the other end of the shaft portion of the second swirl generating portion 463. The number of the vanes is three in the present invention, but the present invention is not limited this embodiment. Further, the shape of the vanes of the second swirl generating portion 463 is not particularly limited if the vanes can cause swirling flow of the fluid which has been diffused by the fluid diffusing portion 442 of the first internal structure 440 and has flowed into the second swirl generating portion 463 while the fluid passes between the vanes. In the present embodiment, the outer diameter of the second swirl generating portion 463 is such that it is close to the inner circumferential surface of the tubular portion 134 of the outlet side member 130 of the pipe body 110 when the second internal structure 460 is housed in the pipe body 110.

The second flow characteristic providing portion 465 of the second internal structure 460 has a similar structure (see FIGS. 5A and 5B) and can be formed by a similar method (see FIG. 8) as the flow characteristic providing portion 145 of the first embodiment. More specifically, the second flow characteristic providing portion 465 includes a shaft portion having a circular cross-section and a plurality of protrusions protruding from the outer circumferential surface of the shaft portion. The shaft portion has a diameter constant along the longitudinal direction of the shaft member 461. Each of the plurality of protrusions is in the form of a pillar having a rhombic cross-section and the plurality of protrusions are formed in a net shape. Each of the plurality of rhombic protrusions is formed, for example, by grinding the cylindrical member so as to protrude outward radially from the outer circumferential surface of the shaft portion. The diameter of the shaft portion of the second flow characteristic providing portion 465 is larger than the diameter of the shaft portion of the second swirl generating portion 463. A plurality of grooves are formed on the outer circumferential surface of the shaft portion of the second flow characteristic providing portion 465 so as to spirally extend from one end to the other end of the shaft portion along the circumference of the shaft portion. Each of the plurality of grooves is in the form of "V" (see FIG. 6A), "R" (see FIG. 6B), the trapezoid (see FIG. 6C), any other polygon, or the like. The grooves form guide channels for guiding the fluid between the plurality of protrusions and grooves subsequent thereto. The guide channels and subsequent grooves may be formed from the upstream end to a predetermined point of the shaft portion of the second flow characteristic providing portion 465 instead of being formed from the upstream end to the downstream end of the shaft portion. In this case, the guide channels and subsequent grooves may be tapered such their depth decreases toward the downstream side of the second flow characteristic providing portion 465. In the present embodiment, the outer diameter of the second flow characteristic providing portion 465 is such that it is close to the inner circumferential surface of the tubular portion 134 of the outlet side member 130 of the pipe body 110 when the second internal structure 460 is housed in the pipe body 110.

In FIG. 14, the dashed line B indicates the position of the bottom surface (for example, the vertex) of the groove (for example, the V-shaped groove, the R-shaped groove, the trapezoidal groove, or any other polygonal groove). In the present embodiment, the depth of the groove is determined as the difference between the radius of the shaft portions of the second flow characteristic providing portion 465 and the radius of the shaft portions of the second swirl generating portions 463. By this, in spite of a step due to the difference in radius between the shaft portions of the second swirl generating portion 463 and the second flow characteristic providing portion 465 (in other words, by offsetting the differences in radius), the fluid is smoothly guided from the second swirl generating portion 463 to the second flow characteristic providing portion 465. In addition, the groove subsequent to the guide channel helps the fluid flow at a proper velocity. The present invention is not limited to this embodiment. The depth of the groove is sufficient to completely or partially offset the difference in diameter between the shaft portions so that the fluid can be smoothly guided from the second swirl generating portion 463 to the second flow characteristic providing portion 465. In another embodiment, the guide channel is formed such that the depth of the groove is (the radius of the shaft portion of the second flow characteristic providing portion 465—the radius of the shaft portion of the second swirl generating portion 463) at the upstream end of the second flow characteristic providing portion 465 and the groove becomes gradually shallower so that the depth is zero at a predetermined point. In other words, the guide channel is formed in a tapered shape from the upstream end to the predetermined point of the second flow characteristic providing portion 465.

The second guiding portion 460 is formed, for example, by machining the downstream end of the cylindrical member in a shape of a truncated dome (i.e. a dome whose head is cut). As shown in FIG. 14, the shaft portion of the second flow characteristic providing portion 465 is extended between the second flow characteristic providing portion 465 and the second guiding portion 470. The length of this shaft extension portion 466 is determined based on at least one of the convenience of processing, the Coanda effect of the second guiding portion 470, and the size of the first internal structure 440, for example. The shape of the second guiding portion 470 is not limited to the truncated dome and can be formed in a different shape. In another embodiment, the second guiding portion 470 is formed in a truncated cone shape.

It is preferable that the diameter of the hollow of the second internal structure 460 is bigger on the side of its inlet 471 than on the side of its outlet 472. In the present embodiment, the inner diameter of the second internal structure 460 is uniform from the inlet 471 to the shaft extension portion 466 of the second flow characteristic providing portion 465 and becomes smaller at the second guiding portion 470, as shown in FIG. 15. Thus, a step 468 exists at the boundary between the shaft extension portion 466 and the second guiding portion 470 in the hollow of the second internal structure 460. By this, it is possible to house the first internal structure 440 in the hollow of the second internal structure 460 through the inlet 471 of the second internal structure 460 and to prevent the first internal structure 440 from escaping to the outside of the second internal structure 460 through the outlet 472. The inner diameter of the second guiding portion 470 is bigger than the outer diameter of the first guiding portion 450 of the first internal structure 440.

Figure 19:
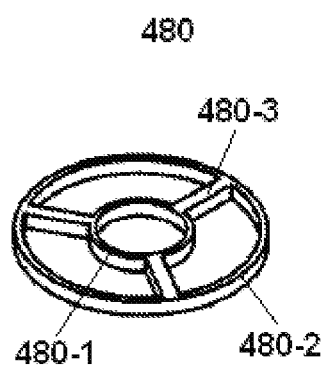
FIG. 19 is a three-dimensional view of a press plate of the fluid supply pipe according to the fourth embodiment of the present invention.

As shown in FIG. 14, the fluid supply pipe 400 includes the press plate 480. FIG. 19 is a three-dimensional view of the press plate 480 according to the present embodiment. As shown in FIG. 19, the press plate 480 includes a ring 480-1 of a small radius, a ring 480-2 of a radius bigger than the radius of the ring 480-1, and three supporting arms 480-3 connecting the ring 480-1 and the ring 480-2. The outer diameter of the ring 480-2 is such that the ring 480-2 is close to the inner peripheral surface of the female screw 126 of the inlet side member 120, as shown in FIG. 14. The press plate 480 is made of metal such as steel or plastic, for example.

In the present embodiment, the radius of the ring 480-1 is bigger than the maximum radius of the fluid diffusing portion 442 of the first internal structure 440 and smaller than the maximum radius of the first swirl generating portion 443 (i.e. the distance from the center of the shaft portion of the first swirl generating portion 443 to the end of each vane), as shown in FIG. 14. By this dimensional relationship, the press plate 480 prevents the first internal structure 440 from escaping from the pipe body 110 through the inlet 111 of the pipe body 110. The fluid supply pipe 400 is assembled by housing the first internal structure 440 and the second internal structure 460 in the outlet side member 130 after inserting the first internal structure 440 into the hollow of the second internal structure 460, placing the press plate 480 at the head of the second internal structure 460 such that the fluid diffusing portion 442 of the first internal structure 440 protrudes through the ring 480-1, and then engaging the male screw 132 of the outer circumferential surface of the outlet side member 130 with the female screw 126 of the inner circumferential surface of the inlet side member 120. By this assembly, the first internal structure 440 cannot escape from the pipe body 110 through the inlet 111 due to the press plate 480, and cannot escape from the second internal structure 460 through the outlet 472 of the second internal structure 460 because the radius of the outlet 472 is smaller than the radius of the inlet 471. As described above, the press plate 480 keeps the first internal structure 440 confined in the hollow of the second internal structure 460.

Now, flow of the fluid passing through the fluid supply pipe 400 is described with reference to FIGS. 14 to 17. The fluid enters the inlet 111 of the fluid supply pipe 400 through the delivery pipe 6 (see FIG. 1). The fluid bumps into the fluid diffusing portion 442 of the first internal structure 440 protruding through the ring 480-1 and diffuses outward (i.e. radially) from the center of the fluid supply pipe 400 while passing through the internal space of the tapered portion 124 of the inlet side member 120. Then, a part of the fluid flows into the hollow of the second internal structure 460 in which the first internal structure 440 is housed and the rest of the fluid flows into the internal space of the outlet side member 130 in which the second internal structure 460 is housed.

The fluid flowing into the hollow of the second internal structure 460 in which the first internal structure 440 is housed passes between the three vanes of the first swirl generating portion 443 formed in the spiral shape in the counterclockwise direction. The fluid diffusing portion 442 induces the fluid flowing into the fluid supply pipe 440 through the delivery pipe 9 to enter the first swirl generating portion 443 effectively. The fluid vigorously swirls due to the vanes of the first swirl generating portion 443 and flows to the first flow characteristic providing portion 445.

Then, the fluid passes between the plurality of rhombic protrusions formed regularly on the outer circumferential surface of the shaft portion of the first flow characteristic providing portion 445. The plurality of rhombic protrusions form a plurality of narrow flow paths. As the fluid passes through the plurality of narrow flow paths formed by the plurality of rhombic protrusions, a large number of minute vortices generate in the fluid and the cavitation phenomenon occurs. As a result, the fine bubbles are generated. The above-described structure of the first flow characteristic providing portion 445 is useful when two or more fluids having different properties need to be mixed.

The first internal structure 440 is configured such that the fluid flows from the upstream side (the first swirl generating portion 443) having a large cross-sectional area to the downstream side (the flow paths formed between the plurality of rhombic protrusions of the first flow characteristic providing portion 445) having a small cross-sectional area. The first internal structure 440 of the fluid supply pipe 400 of the present embodiment causes the cavitation phenomenon and many fine bubbles are generated while the fluid passes the first flow characteristic providing portion 445. The fine bubbles improve the penetrability and lubricity of the fluid. Due to improvement of the penetrability, the cooling efficiency is increased.

The fluid flows toward the end of the first internal structure 440 after passing the first flow characteristic providing portion 445. While the fluid flows from the plurality of narrow flow paths formed by the plurality of protrusions of the first flow characteristic providing portion 445 to the first guiding portion 450 formed at one end of the first internal structure 440, a path through which the fluid flows is rapidly widened. At this time, the Coanda effect is generated by the curved surface of the first guiding portion 450 formed in the dome shape of the first internal structure 440. Due to the Coanda effect, the fluid is guided to flow along the surface of the first guiding portion 450. The fluid guided by the dome-shaped first guiding portion 450 toward the center of the pipe passes the tapered portion 136 of the outlet side member 130 and flows out of the outlet 112.

The fluid flowing into the internal space of the outlet side member 130 in which the second internal structure 460 is housed passes between the three vanes of the second swirl generating portion 463 formed in the spiral shape in the counterclockwise direction. The fluid vigorously swirls due to the vanes of the second swirl generating portion 463 and flows to the second flow characteristic providing portion 465. Then, the fluid passes between the plurality of rhombic protrusions formed regularly on the outer circumferential surface of the shaft portion of the second flow characteristic providing portion 465. Similarly to the first internal structure 440, the second internal structure 460 is configured such that the fluid flows from the upstream side (the second swirl generating portion 463) having a large cross-sectional area to the downstream side (the flow paths formed between the plurality of rhombic protrusions of the second flow characteristic providing portion 465) having a small cross-sectional area. Further, since the diameter of the shaft portion of the second flow characteristic providing portion 465 is larger than the diameter of the shaft portion of the second swirl generating portion 463, a path through which the fluid flows narrows sharply while the fluid flows from the second swirl generating portion 463 to the second flow characteristic providing portion 465. In spite of the difference in diameter of the shaft portions between the second swirl generating portion 463 and the second flow characteristic providing portion 465, the fluid is smoothly guided toward the second flow characteristic providing portion 465 by the plurality of guide channels formed on the second flow characteristic providing portion 465 and the fluid velocity does not significantly decrease even at the bottoms of the flow paths throughout the second flow characteristic providing portion 465 due to the subsequent grooves. Due to the structure of the second flow characteristic providing portion 465, a large number of minute vortices generate in the fluid and the cavitation phenomenon occurs. As a result, many fine bubbles are generated in the fluid.

Then, the fluid flows toward the end of the second internal structure 460 after passing the second flow characteristic providing portion 465. When the fluid flows from the plurality of narrow flow paths formed by the plurality of protrusions of the second flow characteristic providing portion 465 toward the second guiding portion 470 formed at the end of the second internal structure 460, a path through which the fluid flows is rapidly widened and the Coanda effect occurs. As described above, the fluid is guided to flow along the surface of the second guiding portion 470 due to the Coanda effect. The fluid guided by the truncated dome-shaped second guiding portion 470 toward the center of the pipe passes the tapered portion 136 of the outlet side member 130 and flows out of the outlet 112.

The part of the fluid flowing through the hollow of the second internal structure 460 and the rest of the fluid flowing through the internal space of the outlet side member 130 join together in the tapered portion 136, flows out through the outlet 112, and is discharged toward the grinding spot G through the nozzle 6. When the fluid is discharged through the nozzle 6, the many fine bubbles generated in the first flow characteristic providing portion 445 and the second flow characteristic providing portion 465 are exposed to atmospheric pressure. Then, the fine bubbles collide with the grinding blade 2 and the workpiece W and break, or explode and disappear. Vibration and shock generated during the extinction of the bubbles effectively remove sludge or chips generated at the grinding spot G. In other words, the cleaning effect around the grinding spot G is improved as the fine bubbles disappear.

Since the fluid diffusing portion 442, the first swirl generating portion 443, the first flow characteristic providing portion 445, and the first guiding portion 450 of the first internal structure 440 are formed by processing the one member according to the present embodiment, the first internal structure 440 is manufactured as a single integrated component. Further, since the second swirl generating portion 463, the second flow characteristic providing portion 465, and the second guiding portion 470 of the second internal structure 460 are formed by processing the one member according to the present embodiment, the second internal structure 460 is manufactured as a single integrated component. Due to the above-described configuration and dimensional relationship, the first internal structure 440, the second internal structure 460, and the press plate 480 can be self-aligned. Therefore, it is possible to manufacture the fluid supply pipe 400 only by a simple process of housing the first internal structure 440 and the second internal structure 460 in the outlet side member 130 after inserting the first internal structure 440 into the hollow of the second internal structure 460, placing the press plate 480 at the head of the first internal structure 440, and then engaging the male screw 132 of the outer circumferential surface of the outlet side member 130 with the female screw 126 of the inner circumferential surface of the inlet side member 120. By this, it is easy to assemble the parts of the fluid supply pipe 400 and the time required to manufacture the fluid supply pipe 400 is reduced. The pressing plate 480 is not limited to the example shown in FIG. 19, but may have another shape capable of preventing the first internal structure 440 from being separated. Alternately, the first internal structure 440 may be fixed to the second internal structure 460 by a fixing bolt without using the press plate 480.

While two internal structures are housed in the pipe body in the fourth embodiment, the present invention can provide a fluid supply pipe of a multilayered structure including three or more internal structures. In the case that each of the three or more internal structures includes a flow characteristic providing portion, a large number of fine bubbles are generated in a fluid flowing through the fluid supply pipe. The flow characteristic providing portion of at least one of the three or more internal structures includes one or more guide channels and one or more grooves subsequent thereto as described above.

Although the present invention have been described with respect to the examples in which the fluid supply apparatus of the present invention is applied to the machine tool to discharge the coolant, the present invention is applicable to various applications for supplying one or more fluids. For example, the present invention is applicable to a household shower nozzle. When cold water and hot water flow into the fluid supply apparatus, the flow characteristics described above are provided to the water by the internal structure(s) and then discharged, thereby improving the cleaning effect. The present invention is also applicable to a fluid mixing apparatus. When a plurality of kinds of fluids having different properties flows into the fluid supply apparatus, the flow characteristics described above are provided to the plural kinds of fluids by the internal structure(s), and these fluids are mixed and then discharged. In addition, by employing the fluid supply apparatus of the present invention in a hydroponics system, it is possible to increase dissolved oxygen in water supplied by the system to maintain or raise the oxygen amount (i.e. dissolved oxygen concentration) in the water. The fluid supply apparatus of the present invention can also be applied to any fluid having a high viscosity, and can change the viscosity or other properties of various fluids.

Although some embodiments of the present invention have been described above, the embodiments are for illustrative purposes only and not intended to limit the technical scope of the present invention. It will be apparent to those skilled in the art that many other possible embodiments and various modifications of the present invention may be made in light of the specification and drawings. Although a plurality of specific terms are used herein, they are used in a generic sense only for the purpose of explanation and are not used for the purpose of limiting the invention. The embodiments and modifications fall within the scope and the spirit of the invention described in this specification and within the scope of the invention as defined in the appended claims and equivalents thereof.

What is claimed is:

1. A fluid supply apparatus comprising:
a housing, and
an internal structure which is housed in the housing,
wherein the internal structure comprises a shaft portion having a circular cross-section and a plurality of protrusions protruding from an outer circumferential surface of the shaft portion,
the plurality of protrusions are formed by intersecting a plurality of spiral flow paths spaced along a circumference of the shaft portion and a plurality of closed flow paths spaced along a longitudinal direction of the shaft portion, and
a groove having a predetermined depth in a radial direction of the shaft portion from the outer circumferential surface of the shaft portion which is a bottom of each of the plurality of closed flow paths is formed in at least a part of each of one or more of the plurality of spiral flow paths, the groove spirally extending along the outer circumferential surface of the shaft portion.

2. The fluid supply apparatus of claim 1, wherein the groove has one of a V-shaped cross-section, a R-shaped cross-section, a trapezoidal cross-section, or any other polygonal cross-section.

3. The fluid supply apparatus of claim 1, wherein the groove prevents velocity of a fluid flowing through the fluid supply apparatus from being decreased at a bottom of the spiral flow path in which the groove is formed.

4. A fluid supply apparatus comprising:
an internal structure, and
a housing configured to house the internal structure,
the housing having an inlet and an outlet, and
the internal structure comprising a first portion and a second portion, which are formed integrally on a common shaft having a circular cross-section,
wherein the first portion of the internal structure is positioned upstream of the housing when the internal structure is housed in the housing and comprises a shaft portion and at least one spiral vane to swirl a fluid,
the second portion of the internal structure is positioned downstream from the first portion and comprises a shaft portion and a plurality of protrusions protruding from an outer circumferential surface of the shaft portion,
the plurality of protrusions of the second portion are formed by intersecting a plurality of spiral flow paths spaced along a circumference of the shaft portion of the second portion and a plurality of closed flow paths spaced along a longitudinal direction of the shaft portion, and
a groove having a predetermined depth in a radial direction of the shaft portion of the second portion from the outer circumferential surface of the shaft portion which is a bottom of each of the plurality of closed flow paths is formed in at least a part of each of one or more of the plurality of spiral flow paths.

5. The fluid supply apparatus of claim 4, wherein the first portion of the internal structure comprises three vanes and each of the three vanes has its end spaced by 120 degrees from each other in a circumferential direction of the shaft portion of the first portion.

6. The fluid supply apparatus of claim 4, wherein the plurality of protrusions of the second portion of the internal structure are formed in a net shape and each of the plurality of protrusions is in the form of a pillar having a rhombic cross-section.

7. The fluid supply apparatus of claim 4, wherein a radius of the shaft portion of the second portion of the internal structure is larger than a radius of the shaft portion of the first portion of the internal structure,
the groove is formed on the shaft portion of the second portion, and
the predetermined depth of the groove is the same as a difference between the radius of the shaft portion of the second portion and the radius of the shaft portion of the first portion.

8. The fluid supply apparatus of claim 4, wherein the groove is formed on the shaft portion of the second portion and extends from one end to the other end of the shaft portion of the second portion.

9. The fluid supply apparatus of claim 4, wherein the groove has one of a V-shaped cross-section, a R-shaped cross-section, a trapezoidal cross-section, or any other polygonal cross-section.

10. The fluid supply apparatus of claim 4, wherein the groove spirally extends along the outer circumferential surface of the shaft portion of the second portion.

11. The fluid supply apparatus of claim 4, wherein the shaft portion of the second portion of the internal structure has a diameter constant along a longitudinal direction of the common shaft.

12. The fluid supply apparatus of claim 4, wherein the housing is a pipe body which comprises an inlet side part and an outlet side part, and the inlet side part and the outlet side part are connected by screw-joining.

13. A machine tool comprising:
a fluid supply apparatus of claim 1,
wherein the machine tool allows coolant to flow into the fluid supply apparatus to provide a predetermined flow characteristic to the coolant and the coolant is discharged from the fluid supply apparatus to a tool or a workpiece to cool it.

* * * * *